US007840488B2

(12) United States Patent
Tieu et al.

(10) Patent No.: US 7,840,488 B2
(45) Date of Patent: Nov. 23, 2010

(54) SYSTEM AND METHOD FOR GRANTING ACCESS TO AN ITEM OR PERMISSION TO USE AN ITEM BASED ON CONFIGURABLE CONDITIONS

(75) Inventors: Vincent Tieu, Torrance, CA (US); Joseph Z. Fung, Cerritos, CA (US); Eddie Chen, Rancho Palos Verdes, CA (US); Bijan Tadayon, Germantown, MD (US)

(73) Assignee: ContentGuard Holdings, Inc., Wilmington, DE (US)

( * ) Notice: Subject to any disclaimer, the term of this patent is extended or adjusted under 35 U.S.C. 154(b) by 1833 days.

(21) Appl. No.: 10/712,268

(22) Filed: Nov. 14, 2003

(65) Prior Publication Data
US 2004/0230529 A1 Nov. 18, 2004

Related U.S. Application Data

(63) Continuation-in-part of application No. 10/298,220, filed on Nov. 18, 2002.

(60) Provisional application No. 60/331,619, filed on Nov. 20, 2001, provisional application No. 60/331,622, filed on Nov. 20, 2001, provisional application No. 60/359,646, filed on Feb. 27, 2002, provisional application No. 60/359,661, filed on Feb. 27, 2002.

(51) Int. Cl.
*G06F 21/00* (2006.01)
(52) U.S. Cl. ............................. 705/51; 705/52; 705/64
(58) Field of Classification Search .................. 705/51, 705/52, 64
See application file for complete search history.

(56) References Cited
U.S. PATENT DOCUMENTS

| | | | |
|---|---|---|---|
| 4,159,468 A | 6/1979 | Barnes et al. | |
| 4,200,700 A | 4/1980 | Mäder | |
| 4,361,851 A | 11/1982 | Asip et al. | |
| 4,423,287 A | 12/1983 | Zeidler | |

(Continued)

FOREIGN PATENT DOCUMENTS

BR 9810967 A 10/2001

(Continued)

OTHER PUBLICATIONS

PCT International Search Report (second sheet) dated Apr. 22, 2003 (PCT/US02/37080).

(Continued)

*Primary Examiner*—Pierre E Elisca
(74) *Attorney, Agent, or Firm*—Reed Smith LLP; Marc S. Kaufman; Stephen M. Hertzler

(57) ABSTRACT

A method, system, device, and computer program product for processing plural rights expressions associated with an item for use in a system for controlling use of the item in accordance with the rights expressions, including receiving a request to use an item, the item having associated rights expressions governing use of the item; returning one or more rights expressions including conditions that must be satisfied in order to use the item; and processing the returned rights expressions in a manner to facilitate selection of the returned rights expressions in order to use the item in accordance with the selected rights expressions.

37 Claims, 18 Drawing Sheets

U.S. PATENT DOCUMENTS

| | | | |
|---|---|---|---|
| 4,429,385 | A | 1/1984 | Cichelli et al. |
| 4,621,321 | A | 11/1986 | Boebert et al. |
| 4,736,422 | A | 4/1988 | Mason |
| 4,740,890 | A | 4/1988 | William |
| 4,796,220 | A | 1/1989 | Wolfe |
| 4,816,655 | A | 3/1989 | Musyck et al. |
| 4,888,638 | A | 12/1989 | Bohn |
| 4,937,863 | A | 6/1990 | Robert et al. |
| 4,953,209 | A | 8/1990 | Ryder et al. |
| 4,977,594 | A | 12/1990 | Shear |
| 5,014,234 | A | 5/1991 | Edwards |
| 5,129,083 | A | 7/1992 | Cutler et al. |
| 5,138,712 | A | 8/1992 | Corbin |
| 5,174,641 | A | 12/1992 | Lim |
| 5,204,897 | A | 4/1993 | Wyman |
| 5,247,575 | A | 9/1993 | Sprague et al. |
| 5,260,999 | A | 11/1993 | Wyman |
| 5,276,444 | A | 1/1994 | McNair |
| 5,287,408 | A | 2/1994 | Samson |
| 5,291,596 | A | 3/1994 | Mita |
| 5,293,422 | A | 3/1994 | Loiacono |
| 5,335,275 | A | 8/1994 | Millar et al. |
| 5,337,357 | A | 8/1994 | Chou et al. |
| 5,386,369 | A | 1/1995 | Christiano |
| 5,390,297 | A | 2/1995 | Barber et al. |
| 5,414,852 | A | 5/1995 | Kramer et al. |
| 5,453,601 | A | 9/1995 | Rosen |
| 5,485,577 | A | 1/1996 | Eyer et al. |
| 5,504,816 | A | 4/1996 | Hamilton et al. |
| 5,530,235 | A | 6/1996 | Stefik et al. |
| 5,535,276 | A | 7/1996 | Ganesan |
| 5,553,143 | A | 9/1996 | Ross et al. |
| 5,557,678 | A | 9/1996 | Ganesan |
| 5,564,038 | A | 10/1996 | Grantz et al. |
| 5,625,690 | A | 4/1997 | Michel et al. |
| 5,629,980 | A | 5/1997 | Stefik et al. |
| 5,636,346 | A | 6/1997 | Saxe |
| 5,638,443 | A | 6/1997 | Stefik et al. |
| 5,638,513 | A | 6/1997 | Ananda |
| 5,708,709 | A | 1/1998 | Rose |
| 5,715,403 | A | 2/1998 | Stefik |
| 5,745,879 | A | 4/1998 | Wyman |
| 5,764,807 | A | 6/1998 | Pearlman et al. |
| 5,765,152 | A | 6/1998 | Erickson |
| 5,787,172 | A | 7/1998 | Arnold |
| 5,790,677 | A | 8/1998 | Fox et al. |
| 5,812,664 | A | 9/1998 | Bernobich et al. |
| 5,825,876 | A | 10/1998 | Peterson |
| 5,825,879 | A | 10/1998 | Davis |
| 5,838,792 | A | 11/1998 | Ganesan |
| 5,848,154 | A | 12/1998 | Nishio et al. |
| 5,848,378 | A | 12/1998 | Shelton et al. |
| 5,850,443 | A | 12/1998 | Van Oorschot et al. |
| 5,892,900 | A | 4/1999 | Ginter et al. |
| 5,915,019 | A | 6/1999 | Ginter et al. |
| 5,917,912 | A | 6/1999 | Ginter et al. |
| 5,933,498 | A | 8/1999 | Schneck et al. |
| 5,940,504 | A | 8/1999 | Griswold |
| 5,982,891 | A | 11/1999 | Ginter et al. |
| 5,987,134 | A | 11/1999 | Shin et al. |
| 5,999,624 | A | 12/1999 | Hopkins |
| 6,006,332 | A | 12/1999 | Rabne et al. |
| 6,020,882 | A | 2/2000 | Kinghorn et al. |
| 6,047,067 | A | 4/2000 | Rosen |
| 6,073,234 | A | 6/2000 | Kigo et al. |
| 6,091,777 | A | 7/2000 | Guetz et al. |
| 6,112,239 | A | 8/2000 | Kenner et al. |
| 6,135,646 | A | 10/2000 | Kahn et al. |
| 6,141,754 | A | 10/2000 | Choy |
| 6,157,719 | A | 12/2000 | Wasilewski et al. |
| 6,169,976 | B1 | 1/2001 | Colosso |
| 6,185,683 | B1 | 2/2001 | Ginter et al. |
| 6,189,037 | B1 | 2/2001 | Adams et al. |
| 6,189,146 | B1 | 2/2001 | Misra et al. |
| 6,209,092 | B1 | 3/2001 | Linnartz |
| 6,216,112 | B1 | 4/2001 | Fuller et al. |
| 6,219,652 | B1 | 4/2001 | Carter et al. |
| 6,236,971 | B1 | 5/2001 | Stefik et al. |
| 6,307,939 | B1 | 10/2001 | Vigarie |
| 6,353,888 | B1 | 3/2002 | Kakehi et al. |
| 6,397,333 | B1 | 5/2002 | Söhne et al. |
| 6,401,211 | B1 | 6/2002 | Brezak, Jr. et al. |
| 6,405,369 | B1 | 6/2002 | Tsuria |
| 6,424,717 | B1 | 7/2002 | Pinder et al. |
| 6,424,947 | B1 | 7/2002 | Tsuria et al. |
| 6,487,659 | B1 | 11/2002 | Kigo et al. |
| 6,516,052 | B2 | 2/2003 | Voudouris |
| 6,516,413 | B1 | 2/2003 | Aratani et al. |
| 6,523,745 | B1 | 2/2003 | Tamori |
| 6,796,555 | B1 | 9/2004 | Blahut |
| 2001/0009026 | A1 | 7/2001 | Terao et al. |
| 2001/0011276 | A1 | 8/2001 | Durst, Jr. et al. |
| 2001/0014206 | A1 | 8/2001 | Artigalas et al. |
| 2001/0037467 | A1 | 11/2001 | O'Toole, Jr. et al. |
| 2001/0039659 | A1 | 11/2001 | Simmons et al. |
| 2002/0001387 | A1 | 1/2002 | Dillon |
| 2002/0035618 | A1 | 3/2002 | Mendez et al. |
| 2002/0044658 | A1 | 4/2002 | Wasilewski et al. |
| 2002/0056118 | A1 | 5/2002 | Hunter et al. |
| 2002/0069282 | A1 | 6/2002 | Reisman |
| 2002/0099544 | A1* | 7/2002 | Levitt et al. .................. 704/247 |
| 2002/0099948 | A1 | 7/2002 | Kocher et al. |
| 2002/0127423 | A1 | 9/2002 | Kayanakis |
| 2003/0055810 | A1* | 3/2003 | Cragun et al. .................. 707/1 |
| 2003/0097567 | A1 | 5/2003 | Terao et al. |
| 2003/0125976 | A1* | 7/2003 | Nguyen et al. .................. 705/1 |
| 2004/0034582 | A1* | 2/2004 | Gilliam et al. ................. 705/31 |
| 2004/0052370 | A1 | 3/2004 | Katznelson |
| 2004/0172552 | A1 | 9/2004 | Boyles et al. |
| 2005/0234727 | A1* | 10/2005 | Chiu ....................... 704/270.1 |

FOREIGN PATENT DOCUMENTS

| | | |
|---|---|---|
| EP | 0 067 556 B1 | 12/1982 |
| EP | 0 257 585 A2 | 3/1988 |
| EP | 0 332 304 A2 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2236604 A | 4/1991 |
| GB | 2309364 A | 7/1997 |
| GB | 2316503 A | 2/1998 |
| GB | 2354102 A | 3/2001 |
| JP | 5-100939 | 4/1993 |
| JP | 5168039 A2 | 7/1993 |
| JP | 7-36768 | 2/1995 |
| JP | 11031130 A2 | 2/1999 |

| | | | |
|---|---|---|---|
| JP | 11032037 A2 | 2/1999 | |
| JP | 11205306 A2 | 7/1999 | |
| JP | 11215121 A2 | 8/1999 | |
| JP | 2000215165 A2 | 8/2000 | |
| JP | 2005218143 A2 | 8/2005 | |
| JP | 2005253109 A2 | 9/2005 | |
| JP | 2006180562 A2 | 7/2006 | |
| WO | WO 83/04461 A1 | 12/1983 | |
| WO | WO 92/20022 A1 | 11/1992 | |
| WO | WO 93/01550 A1 | 1/1993 | |
| WO | WO 93/11480 A1 | 6/1993 | |
| WO | WO 94/03003 A1 | 2/1994 | |
| WO | WO 96/13814 A1 | 5/1996 | |
| WO | WO 96/24092 A2 | 8/1996 | |
| WO | WO 96/27155 A2 | 9/1996 | |
| WO | WO 97/25800 A1 | 7/1997 | |
| WO | WO 97/37492 A1 | 10/1997 | |
| WO | WO 97/41661 A2 | 11/1997 | |
| WO | WO 97/43761 A2 | 11/1997 | |
| WO | WO 98/09209 A1 | 3/1998 | |
| WO | WO 98/10561 A1 | 3/1998 | |
| WO | WO 98/11690 A1 | 3/1998 | |
| WO | WO 98/19431 A1 | 5/1998 | |
| WO | WO 98/43426 A1 | 10/1998 | |
| WO | WO 98/45768 A1 | 10/1998 | |
| WO | WO 99/24928 A2 | 5/1999 | |
| WO | WO 99/34553 A1 | 7/1999 | |
| WO | WO 99/35782 A1 | 7/1999 | |
| WO | WO 99/48296 A1 | 9/1999 | |
| WO | WO 99/60461 A1 | 11/1999 | |
| WO | WO 99/60750 A2 | 11/1999 | |
| WO | WO 00/04727 A2 | 1/2000 | |
| WO | WO 00/05898 A2 | 2/2000 | |
| WO | WO 00/46994 A1 | 8/2000 | |
| WO | WO 00/59152 A2 | 10/2000 | |
| WO | WO 00/62260 A1 | 10/2000 | |
| WO | WO 00/72118 A1 | 11/2000 | |
| WO | WO 00/73922 A2 | 12/2000 | |
| WO | WO 01/03044 A1 | 1/2001 | |
| WO | WO 01/37209 A1 | 5/2001 | |
| WO | WO 2004/034223 A2 | 4/2004 | |
| WO | WO 2004/103843 | 12/2004 | |

OTHER PUBLICATIONS

Blaze et al, "Divertible Protocols and Atomic Proxy Cryptography" 1998 Advances in Cryptography—Euro Crypt International Conference on the Theory and Application of Crypto Techniques, Springer Verlag, DE.

Blaze et al, "Atomic Proxy Cryptography" DRAFT (Online) (Nov. 2, 1997) XP0002239619 Retrieved from the Internet.

No Author, "Capability- and Object-Based Systems Concepts," Capability-Based Computer Systems, pp. 1-19 (no date).

Cox, "Superdistribution" Wired Magazine (Sep. 1994) XP002233405 URL:http://www.wired.com/wired/archive /2.09/superdis_pr.html>.

Dunlop et al, Telecommunications Engineering, pp. 346-352 (1984).

Elgamal, "A Public Key Cryptosystem and a Signature Scheme Based on Discrete Logarithms," IEEE Transactions on Information Theory IT-31(4):469-472 (Jul. 1985).

Gheorghiu et al, "Authorization for Metacomputing Applications" (no date).

Lannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.

Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-472, 593-594 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-164 (no date).

O'Driscoll, The Essential Guide to Digital Set-Top Boxes and Interactive TV, pp. 6-24 (no date).

Ius Mentis, "The ElGamal Public Key System," pp. 1-2 (Oct. 1, 2005) online at http://www.iusmentis.com/technology/encyrption/elgamal/.

Schneier, "Crypto Bibliography," Index of Crypto Papers Available Online, pp. 1-2 (online) (no date).

No Author, No Title, pp. 344-355 (no date).

No Author, "Part Four Networks," No Title, pp. 639-714 (no date).

Microsoft Word User's Guide, pp. 773-774, 315-316, 487-489, 561-564, 744, 624-633 (1993).

No Author, "What is the ElGamal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).

Perritt, "Technologies Strategies for Protecting IP in the Network Multimedia Environment", Apr. 2-3, 1993, Knowbot Permissions.

Delaigle, "Digital Watermarking", Spie Conference in Optical Security and Counterfeit Deterrence Techniques, San Jose, CA Feb. 1996, vol. 2659 pp. 99-110.

Delaigle, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3, 1993).

* cited by examiner

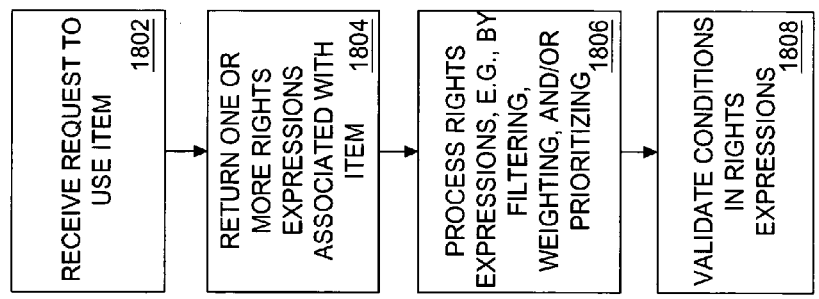

SYSTEM AND METHOD FOR GRANTING ACCESS TO AN ITEM OR PERMISSION TO USE AN ITEM BASED ON CONFIGURABLE CONDITIONS

CROSS REFERENCE TO RELATED DOCUMENTS

The present invention is a continuation-in-part (CIP) of commonly assigned, co-pending, U.S. patent application Ser. No. 10/298,220, filed on Nov. 18, 2002, which claims priority to commonly assigned U.S. Provisional Patent Application Ser. No. 60/331,619, filed Nov. 20, 2001, Ser. No. 60/331,622, filed Nov. 20, 2001, Ser. No. 60/359,646, filed Feb. 27, 2002, and Ser. No. 60/359,661, filed Feb. 27, 2002, the entire disclosures of all of which are hereby incorporated by reference herein.

BACKGROUND OF THE INVENTION

1. Field of the Invention

The present invention is directed to systems and methods for processing rights expressions, and more particularly to a system and method for granting access to an item or permission to use an item based on configurable conditions.

2. Discussion of the Related Art

Digital distribution of content, by content owners, over the Internet is a way to reach out to a potentially large market of Internet users. However, such digital distribution comes with a risk of illegal or otherwise unauthorized, distribution of the content.

Rights Management helps reduce such a risk, thereby enabling content owners to protect and profit from their digital content, for example, based on usage rights that can be used to specify conditions that need be satisfied in order to access the digital content. However, a system, service, device or a consumer may be unable to or unwilling to support certain types of conditions in such rights expressions. For example, an application may not support rights expressions containing fee conditions or an application may not support rights expressions issued by a certain issuer.

In addition, a condition to grant permission can be that the device is to be operated within a certain territory, for example, a given country, state, county, city, and the like. However, the device may not be inside such a territory.

Further, a condition to grant permission can include that a consumer posses a certain type of credential or qualification, such as a club membership, a role in an organization, and the like. However, the consumer may not possess such a credential or qualification. In addition, enforcing of a condition can incur significant fees or other costs to the consumer. For example, the fee and cost may include non-monetary considerations, such as with respect to frequent flyer miles, an agreement to join a club, an agreement to watch (e.g., click through) commercials, filling out of surveys, etc.

Still further, a consumer may have a preference as to certain conditions. However, some of such preferences may be subject to change based on time, location or other factors. In addition, such preferences may need to be expressed in an interactive manner. For example, a consumer may value airline frequent flyer miles at $1 per 100 miles at the beginning of the year and at $1 per 50 miles when the consumer is accumulating the miles for a European vacation.

With current methods and systems, typically, there is no easy way for an application to address the above-noted problems. For example, an application can either pick the first matching rights expression or randomly pick a matching rights expression from a set returned by an interpreter. However, such a method may either select a matching rights expression, including unsupported condition expressions or select a rights expression that is not cost effective or not preferable to a consumer.

An application could have built-in capabilities to analyze the matching rights expressions returned by an interpreter. However, this requires each application to comprehend and process condition expressions and the matching rights expressions, placing a heavy burden on such an application.

SUMMARY OF THE INVENTION

Therefore, there is a need for a system and method that can address the above-noted problems. The above and other needs are addressed by the system, method, device, and computer program product of the exemplary embodiments, which include, for example, an exemplary Configurable Condition Processing System (CPS) that can provide condition processing, for example, including filtering processes, weighting processes, prioritizing processes, and the like, for granting access or permission. Advantageously, the exemplary processes can be used to enable a system, service, device, consumer, and the like, to effectively select a matching rights expression to grant an access or permission request to an item.

Accordingly, in one aspect of the present invention there is provided a method, system, device, and computer program product for processing plural rights expressions associated with an item for use in a system for controlling use of the item in accordance with the rights expressions, including receiving a request to use an item, the item having associated rights expressions governing use of the item; returning one or more rights expressions including conditions that must be satisfied in order to use the item; and processing the returned rights expressions in a manner to facilitate selection of the returned rights expressions in order to use the item in accordance with the selected rights expressions.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 18 is a flowchart for illustrating the operation of the Configurable Condition Processing System of FIG. 14, according to an exemplary embodiment.

DETAILED DESCRIPTION OF THE INVENTION

Figure 1:
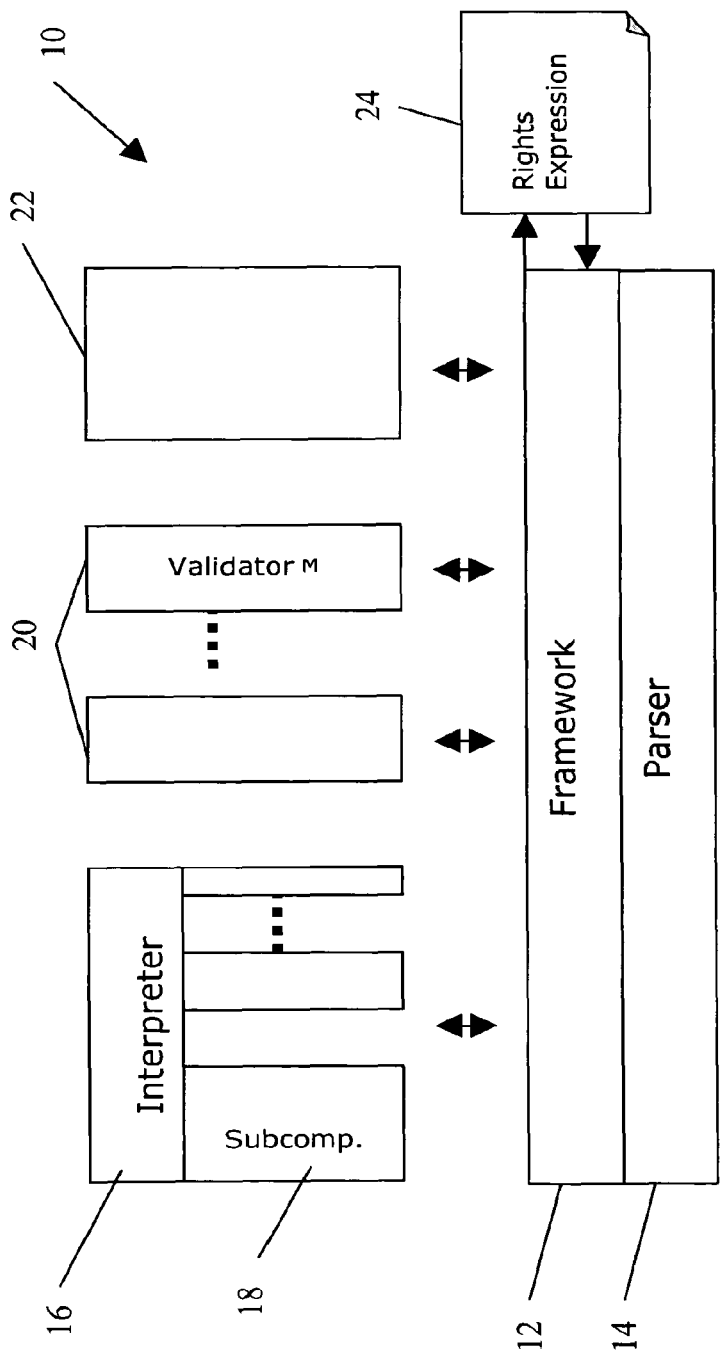
FIG. 1 is a diagram for illustrating an extensible rights expression processing system, according to an exemplary embodiment.

Referring now to the drawings, wherein like reference numerals designate identical or corresponding parts throughout the several views, and more particularly to FIG. 1, wherein there is illustrated an extensible rights expression processing system 10, according to an exemplary embodiment. In FIG. 1, the exemplary rights expression processing system 10, according to an exemplary embodiment, for example, can be used to generate, modify, authorize, and/or validate grammar based rights expressions. Advantageously, the rights expression processing system 10 is extensible to allow new syntaxes to be added without changing semantics or grammars of existing rights expressions to thereby allow accommodation of new rights expressions.

Although the exemplary embodiments are described in terms of the exemplary rights expression processing system, the exemplary embodiments can be implemented in any suitable system, method or device, as will be appreciated by those skilled in the relevant art(s). Accordingly, the exemplary rights expression processing system 10 can be implemented with any suitable type of hardware and/or software, and can include a pre-programmed general-purpose computing device. For example, the rights expression processing system 10 can be implemented using a personal computer, a portable computer, a thin client, and the like. The rights expression processing system 10 can be configured as a single device at a single location or as multiple devices at a single or multiple locations that are connected together using any appropriate communication protocols over any suitable communication medium, such as electric cable, fiber optic cable, any suitable other type of cable or in a wireless manner, for example, using radio frequency, infrared or other technologies.

The exemplary rights expression processing system 10 is illustrated and discussed herein as having a plurality of exemplary components, which perform particular exemplary functions. Such exemplary components, however, are merely schematically illustrated based on their function for clarity purposes, and do not necessarily represent specific hardware and/or software. Accordingly, the exemplary components can be hardware and/or software implemented to substantially perform the particular functions explained. Moreover, two or more of such components can be combined together within the rights expression processing system 10 or divided into more components based on the particular function desired. Thus, the exemplary embodiments, as described with respect to FIG. 1, are illustrative in nature and should not be construed to limit the present invention.

The exemplary rights expression processing system 10 can include a framework 12 that allows interfacing of the other components of the rights expression processing system 10. The framework 12 is the infrastructure component of the rights expression processing system 10 that orchestrates the interactions among the other components of the system and the rights expression-processing functions performed by the various components. Preferably, the framework 12 of the rights expression processing system 10 is rights expression-agnostic, i.e., the framework 12 is not tied to a specific syntax or grammar of rights expressions. Moreover, the framework 12 has an extendible architecture with extensibility points that allow various other components to be added thereto to allow processing of new rights expressions. In further embodiments, however, the framework 12 need not be provided with an extendible architecture with extensibility points, but instead, can be implemented with fixed components, and the like.

The exemplary rights expression processing system 10 also includes a parser 14 adapted to allow parsing and manipulation of data. In particular, the parser 14 is a component that carries out the underlying manipulation operations, such as input, output, syntax validation, and manipulation of the rights expression 24 to be processed by the rights expression processing system 10. The parser 14 can be generic and implemented, for example, as a plug-in component that can be replaced by another parser of similar capability without affecting the behavior of the rights expression processing system 10.

A rights expression need not be limited to licenses in particular, but can include any suitable expressions that can be used by the exemplary rights expression processing system 10 to convey information. Thus, a rights expression and derivatives thereof can generally include expressions of licenses, license components and/or fragments thereof, such as the grant element, principal element, right element, resource element, and/or condition element, as well as any other suitable expressions.

For example, the rights expression 24 can include a grant that comprises a usage right associated with the digital resources and a principal to whom the usage right is granted. The party to whom the grant has been issued is referred to as the "principal," the object of the rights, such as an e-book, can be referred to as the "digital resource," and the right to use such an object can be referred to as the "usage right." In further exemplary embodiments, the rights expression 24 can include a request that comprises a usage right associated with digital resources, and a principal requesting use of the digital resources. Moreover, the rights expression 24 can include a grant, as well as a request. The rights expression 24 can be expressed in an appropriate rights expression language (REL), such as ODRL, XrML, SAML, XACML, MPEG REL, XML-based languages, and the like. In an exemplary embodiment, the underlying parser 14 can be configured to hide rights expression-specific syntaxes and grammars through the use of extensible definitions, for example, such as the XML or XrML schema.

The exemplary rights expression processing system 10 can include an interpreter 16 adapted to evaluate and/or authorize rights expressions 24, and to provide an authorization result. In particular, the interpreter 16 can evaluate the rights expression 24 based on the grant and/or the request set forth in the rights expression 24. The interpreter then can authorize the rights expression 24 without condition, thereby authorizing consumption of the digital resources identified in the rights expression 24. Alternatively, the interpreter 16 can conditionally authorize the rights expression 24 thereby authorizing consumption of the digital resources identified in the rights expression 24 subject to one or more conditions that are set forth in the rights expression 24. Moreover, the interpreter 16 may not authorize the rights expression 24, so that consumption of the digital resources identified in the rights expression 24 cannot be consumed.

The interpreter 16, for example, can be implemented as a plug-in component having a plurality of plug-in subcomponents 18, which are configured to allow evaluation and/or authorization of different rights expressions 24. In addition, new plug-in subcomponents can be added to the interpreter 16 to allow evaluation and/or authorization of new rights expressions thereby allowing the interpreter 16 to be extensible. Because the exemplary rights expression processing system 10 has an extensible architecture, in further exemplary embodiments, new types of interpreters can be added to the rights expression processing system 10 and which are configured to evaluate and/or authorize new types of rights expressions.

The exemplary rights expression processing system 10 further can include one or more validators 20 adapted to validate satisfaction of conditions, if any, which can be set forth in the rights expressions being evaluated. For example, if the interpreter 16 conditionally authorizes the rights expression 24, the validators 20 can be configured to verify the satisfaction of the conditions prior to allowing the consumption of the digital resources identified in the rights expression 24. The exemplary rights expression processing system 10 can include validators A through M, wherein each validator can be configured to evaluate a specific type of condition, by verifying the value of a state variable, for example. The extensible architecture of the exemplary rights expression processing system 10, advantageously, allows new types validators that are configured to evaluate and/or authorize new types rights expressions to be added to the exemplary rights expression processing system 10. For example, a validator N (not shown), for example, implemented as a plug-in component, can be added later to allow validation of a new type of condition that can be expressed in a suitable rights expression to be processed.

Further, the exemplary rights expression processing system 10 also can include a rights expression enabled component, such as an application 22. The application 22 component, for example, can represent the "user" of the rights expression processing system 10. The user can be a creator, a distributor or a consumer of rights expressions. Examples of application 22 can include rights authoring applications and systems, rendering applications of digital content, such as multimedia, video, picture images, and musical artwork, and/or web-service execution systems, and the like. For example, if the application 22 is a consumer of rights expressions, such as a digital content and/or service rendering application, the application 22 can utilize various components of the exemplary extensible rights expression processing system 10 to perform various processing operations, such as parsing, validating or evaluating rights expressions.

Figure 2:
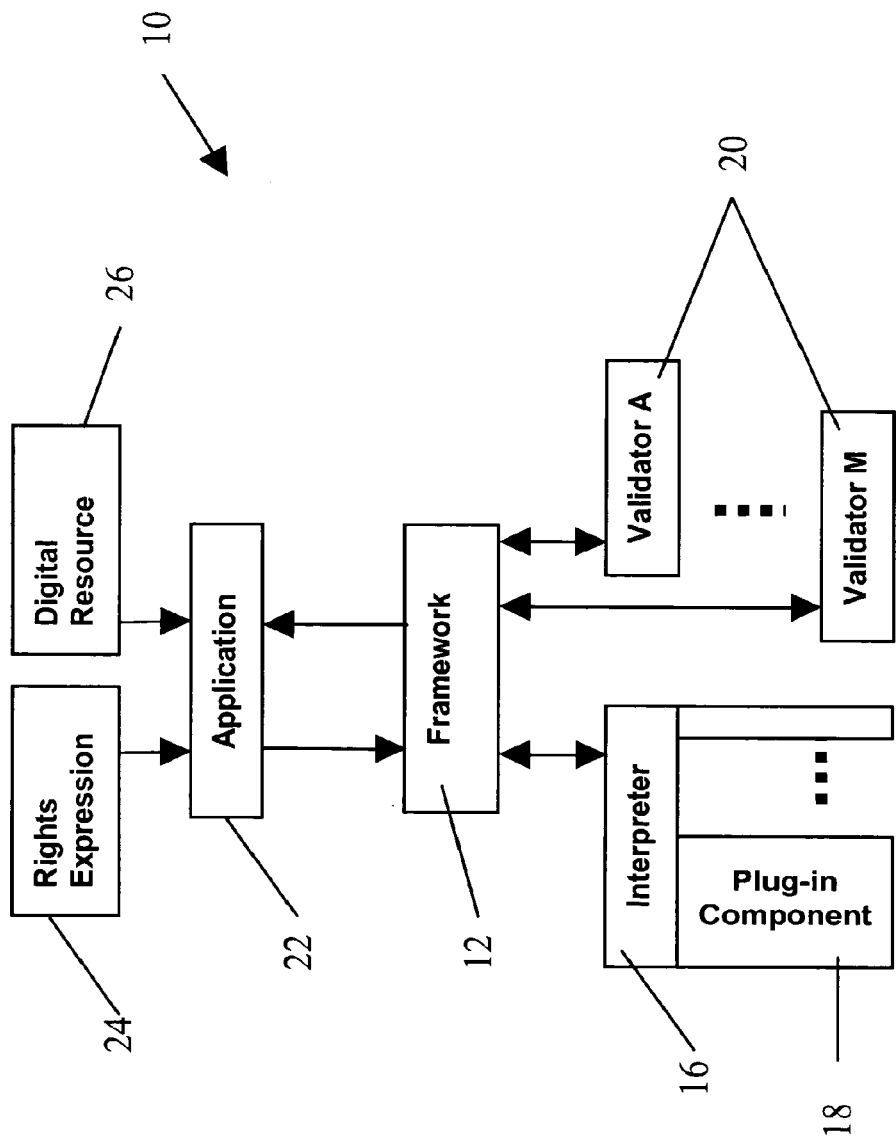
FIG. 2 is a diagram for illustrating the operation of the extensible rights expression processing system of FIG. 1, according to an exemplary embodiment.

FIG. 2 is a diagram for illustrating the operation of the extensible rights expression processing system 10 of FIG. 1, according to an exemplary embodiment. In FIG. 2, the processing of a rights expression can be illustrated, wherein the application 22 receives the rights expression 24 that is associated with the digital resource 26 and includes information regarding the digital resource 26. The rights expression 24 can include a grant that comprises a usage right associated with the digital resource 26 and a principal to whom the usage right is granted. In further exemplary embodiments, the rights expression 24 can be or also include a request that comprises a usage right associated with digital resource 26 and a principal requesting use of the digital resource 26.

The application 22 passes the rights expression 24 with the information regarding the digital resource 26 to the framework 12. The framework 12 then locates the interpreter 16 that is capable of evaluating and/or authorizing the particular rights expression 24, and passes the rights expression 24 to the interpreter 16 for evaluation and/or authorization. The locating of the interpreter 16 that is capable of evaluating and/or authorizing the particular rights expression 24 can be implemented in various different ways. For example, when the interpreter 16 is provided to the rights expression processing system 10, via the framework 12, using the application 22, the interpreter 16 registers with the rights expression processing system 10 all of the suitable rights expressions of a specific namespace that can be evaluated and/or authorized by the interpreter 16. If the interpreter 16 is requested to evaluate and/or authorize a rights expression, the rights expression is looked up to determine if the rights expression was registered by the interpreter 16, which indicates that the interpreter 16 is capable of evaluating and/or authorizing the rights expression. If the rights expression has not been registered by the interpreter 16, thereby, indicating that the interpreter cannot evaluate and/or authorize the rights expression, the interpreter 16 interacts with the framework 12 to locate a different interpreter that has registered the rights expression with the rights expression processing system 10, and passes the authorization request accordingly so that the rights expression can be evaluated and/or authorized. In further exemplary embodiments, however, other methods can be employed to locate the appropriate interpreter for evaluating and/or authorizing rights expressions, as the above method is of an exemplary nature.

The interpreter 16 can be configured to evaluate the rights expression 24 using one or more plug-in subcomponents 18, which are configured to evaluate different types of rights expressions. The interpreter 16 provides an authorization result that can authorize the rights expression 24 without condition, thereby, indicating that the application 22 has a right to consume the digital resource 26 unencumbered. In further exemplary embodiments, the interpreter 16 can conditionally authorize the rights expression 24, thereby, indicating that the application 22 has a right to consume the digital resource 26 upon the satisfaction of one or more conditions that are set forth in the rights expression 24. Moreover, the interpreter 16 may not authorize the rights expression 24, thereby, indicating that the application 22 does not have the right to consume the digital resource 26. The result of the evaluation by the interpreter 16 can be based on the grant and/or the request set forth in the rights expression 24.

Where the rights expression 24 includes both a grant and a request, the evaluation by the interpreter 16 can be attained, for example, by comparing the grant against the request. For example, the usage right, the resource, and the principal set forth in the request can be compared with the usage right, the resource, and the principal included in the grant. The interpreter 16 then can provide an authorization result based on such a comparison.

Thus, in an exemplary embodiment, the interpreter 16 can authorize the request, if the usage right, the resource, and the principal of the request and the grant match one another. The interpreter 16, alternatively, can conditionally authorize the request, if the usage right, the resource, and the principal of the request and the grant match one another, and the grant further includes one or more conditions. Alternatively, the interpreter 16 need not authorize the request, if the usage right, the resource, and the principal of the request and the grant do not match one another.

If the interpreter 16 conditionally authorizes the rights expression 24, the validators 20 allow verification of the satisfaction of the conditions, for example, prior to allowing the consumption of the digital resource 26 identified in the rights expression 24. Each validator (e.g., validator A to validator M) can be configured to evaluate one or more specific types of conditions. Thus, the framework 12 searches and identifies the appropriate validator configured to verify the satisfaction of the condition set forth in the rights expression 24, for example, prior to allowing the consumption of the digital resource 26. The search and identification of appropriate validators can be attained by a method of registering and looking up conditions in a manner similar to that of locating interpreters, as previously described. In further exemplary embodiments, other suitable methods can be employed as well.

The exemplary rights expression processing system 10, advantageously, has an extensible architecture with extensibility points and is capable of being extended to evaluate present and future newly defined grammar-based rights expressions by implementing the various components of the rights expression processing system 10, for example, as plug-in components. Thus, the interpreter 16 can be implemented as a plug-in component having plug-in subcomponents 18, for example, to allow additional interpreters and/or plug-in subcomponents to be added to allow evaluation of new rights expressions that are not initially supported by the rights expression processing system 10. In addition, the validators 20 also can be implemented as plug-in components, so that additional validators can be readily added to allow processing of new conditions. Thus, the exemplary rights expression processing system 10, advantageously, can be readily expandable to process new rights expressions as they are developed in response to new rights granting paradigms and applications.

For example, Vendor A can launch a web-service intending to be the universal issuer and interpreter for rights vouchers, for example, licenses. One challenge that Vendor A would be facing is that it is almost impossible to build such a universal system to accommodate all the possible rights granting paradigms at the time of the launch, because further developments in technology and commerce will likely result in the need for new rights granting paradigms which will entail use of new rights expressions and/or new conditions. However, because the exemplary rights expression processing system 10 can be extensible, Vendor A can build the rights expression processing system 10 using the interpreter 16, and validators 20 that process existing rights expressions. As the need for new rights expression and conditions associated thereto arises, Vendor A can build new components to process such new rights expressions. For example, new type of plug-in subcomponents for the interpreter 16, new interpreters, and/or new validators can be built and added to the exemplary rights expression processing system 10 to process new types rights expressions.

The interpreter 16, thus, can be configured as a plug-in component that is adapted to allow evaluation and authorization of rights expression 24, thereby, providing semantic meanings to rights expression 24. For example, Appendix A illustrates an exemplary license 50 for the rights expression 24. The license 50, for example, grants a principal or other authorized person holding a valid key, an unlimited right to view, print, and copy the subject "eBook," for a flat fee of $25.99.

In FIGS. 1 and 2, the interactions between the interpreter 16, the framework 12, and the application 22 of the exemplary rights expression processing system 10 are as follows. Initially, the application 22 registers trusted plug-in components with the framework 12, such as the interpreter 16, one or more validators 20, and the other supporting plug-in components. The application 22 then makes a programmatic call to the framework 12 to authorize the request of the rights expression 24. The framework 12 then searches for, and invokes, appropriate plug-in components that are capable of authorizing the request against the grants in the rights expression 24. For example, the framework 12 identifies the appropriate interpreter 16 and validator 20 that are configured to evaluate and authorize the rights expression 24, for example, by using the exemplary registration and look-up processes previously described.

The identified interpreter 16 performs various operations to evaluate the request against what is stated in the grant included in the rights expression 24. The right, resource, and principal of the request are matched against the right, resource, and principal of the grant. The step of evaluating the grant also can include decrypting the grant, if the grant is encrypted, verifying a digital signature, if the grant is signed, and/or authenticating the issuer of the grant. In addition, the step of evaluating the request can include authenticating that the principal is genuine, and verifying the resource. The interpreter 16 returns the authorization results to the application 22, indicating whether or not the request is authorized, conditionally authorized or not authorized by the given rights expression 24.

If the interpreter conditionally authorizes the rights expression 24, the application 22 then can invoke the appropriate validator 20 through the framework 12 to validate the corresponding conditions, for example, by having the application 22 provide context data required for validating the conditions set forth. Using the context data, the validator 20 validates compliance with the conditions set forth in the rights expression 24. If the appropriate context data is not provided, then the conditions can be deem to be not satisfied. The above-described method of how the validator 20 can validate compliance with the conditions of the rights expression 24 are of an exemplary nature, and in further exemplary embodiments other suitable methods can be employed.

In the exemplary rights expression 24 set forth in the license 50 of Appendix A, the fee element is a condition associated with all of the rights included in the grant to view, print, and copy the eBook. The fee condition states that the application 22 should only be allowed to exercise the rights if, and only if, a fee of $25.99 has been paid. Accordingly, the validator 20 can be configured to access, for example, a payment record service that provides the required context data to validate that such a condition has been satisfied.

In further exemplary embodiments, however, multiple conditions can be set forth in the rights expression and which require multiple validations. For example, a plurality of the validators 20 can be configured to validate such multiple conditions set forth in the corresponding rights expression. The framework 12 manages the validators 20, and invokes the validators 20, for example, one-by-one, based on the following validation rules:

```
For every condition on the conditions list
    For every validator on the validators list
        Perform condition validation
        If condition is valid, skip to the next by exiting the
        inner for-loop
        If condition is invalid, then skip to the next validator
    End-for (validators list)
End-for (conditions list)
If all conditions are valid, exit validation process and return
a success status
Else exit validation process and return a failure status.
```

The above validation rules are of an exemplary nature and in further exemplary embodiments other suitable rules can be employed.

Figure 3:
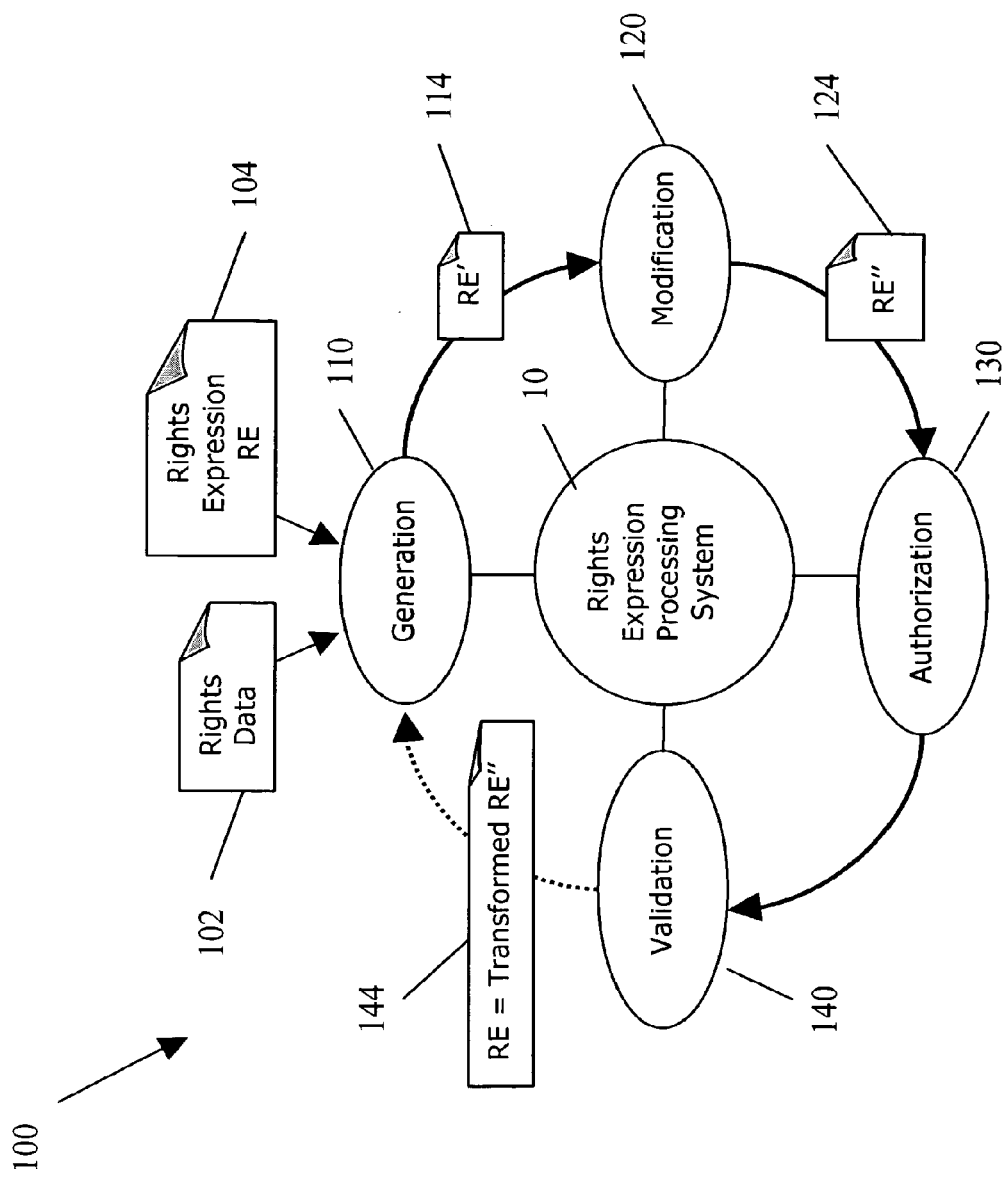
FIG. 3 is a diagram for illustrating a rights expression lifecycle, according to an exemplary embodiment.

FIG. 3 is a diagram for illustrating a rights expression lifecycle 100, according to an exemplary embodiment. In FIG. 3, the exemplary rights expression lifecycle 100 can include basic process stages, for example, including generation 110, modification 120, authorization 130, and validation 140. Each of the exemplary process stages can be performed in the noted sequence to ensure proper processing of enforceable rights expression 104. In further exemplary embodiments, however, the sequence and/or the lifecycle can be altered in any suitable manner.

In FIG. 3, rights data 102 and/or rights expression RE 104 are taken as inputs in the generation process stage 110 and are processed, the processed rights expression RE being indicated by added prime designations as it is processed. For example, rights expression RE' 114 is created as an output of the generation process stage 110. Rights expression RE' 114 is then input into the modification process stage 120, which transforms rights expression RE' 114 into RE" 124. The rights expressions RE, RE', and RE" need not be different, and in certain cases can be the same, for example, if the rights expression is not altered during one or more of the process stages.

In the authorization process stage 130, the rights expression RE" 124 and any suitable supplementary information are received, and the exercising rights described in the rights expression RE" 124 can be evaluated and authorized, for example, as described with respect FIGS. 1 and 2. Following authorization process stage 130 is the validation process stage 140 in which authorized rights expression RE" or a subset thereof, are validated, for example, as described with respect FIGS. 1 and 2, to validate compliance with any suitable conditions set forth therein. Thus, by the end of the various process stages of the rights expression lifecycle 100, the rights expression RE 104 can be transformed into rights expression RE" 124 and can be again used with new rights data 102 in step 144.

The above-described process stages can have their own means for extensibility. For example, to facilitate illustration and understanding of each process stage clearly, the above example of an "eBook" is used to clarify how each process stage effect the rights expressions, and allows extensibility without the need to modify the core rights expression processing system. For example, a publisher of the eBook can allow anyone holding a valid key that was issued by someone the publisher trusts, the unlimited right to view, print and copy the contents of the eBook, as long as they pay a flat fee of $25.99. The rights expressions can be expressed using a variety of RELs, such as ODRL, XrML, SAML, XACML, MPEG REL, XML-based languages, and the like. As noted previously, an enforceable set of rights of a license XrML can be found in the rights expression 24, as set forth in the license 50 of Appendix A. However, a "rights expression" can include any suitable rights expression, for example, including fragments of licenses that are not enforceable by themselves. Accordingly, a rights expression need not only include enforceable licenses.

Figure 4:
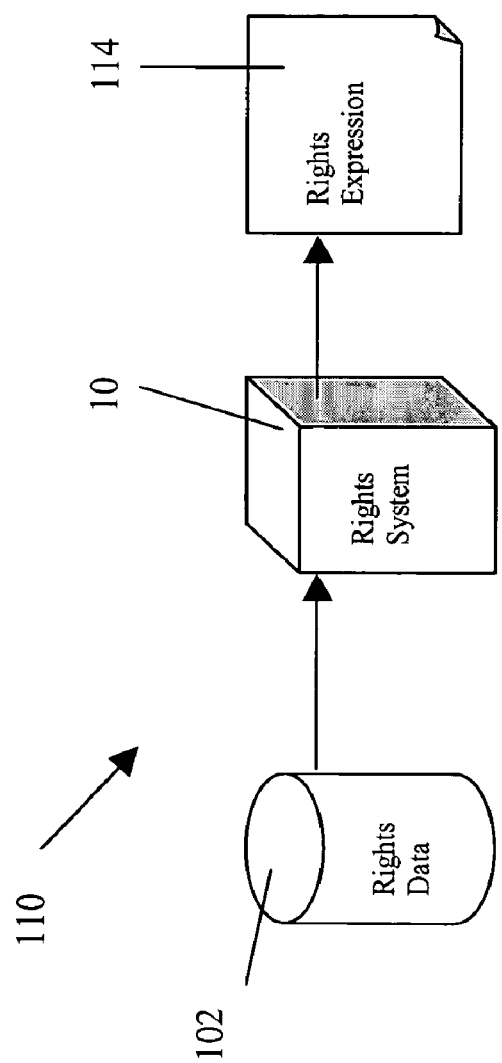
FIG. 4 is a diagram for illustrating a rights expression generation process in the rights expression lifecycle of FIG. 3, according to an exemplary embodiment.

FIG. 4 is a diagram for illustrating the rights expression generation process 110 in the rights expression lifecycle 100 of FIG. 3, according to an exemplary embodiment. In an exemplary embodiment, in order to generate the rights expression for the example eBook in the generation process stage 110, various pieces of information can be made available. For example, the name of the eBook, the key that identifies the principal(s) wishing to use the eBook, and information regarding the payment service that will process the flat fee of $25.99 for use of the eBook can be made available. In FIGS. 3 and 4, such information can be represented as rights data 102. For example, the rights data 102 can be used by the exemplary rights expression processing system 10 to generate the rights expression 114. The rights data 102 can convey such information in either a human or machine-readable format.

The rights expression 104 may or may not be enforceable at this stage of the lifecycle 100. For example, the rights expression 104 can be a fragment of rights that can be merged with additional data in the next stage, for example, the modification process stage 120, to form a rights expression having enforceable rights. In further exemplary embodiments, however, the rights data 102 can be manipulated into rights expressions 104, for example, manually, by someone coding the rights expression directly. Whether such a process takes place in an automated or manual manner, the end result is the generation of rights expression RE' 114, which can be represented in any suitable language or syntax.

The extensibility of the generation process stage 110 allows addition of rights expressions or manipulation of existing rights expressions without the need to change the core rights expression processing system 10. As previously noted, one example REL, which allows such extensibility is the XrML rights expression language based on the W3C XML Schema standard. Such a standard allows the core schema, which defines the language, to remain unchanged, while still allowing external schema references to utilize and expand the language.

Accordingly, in the eBook example, if the publisher that offered the eBook wanted to charge the same $25.99 for use of the eBook, but was required by law to charge the applicable sales tax for sale of the eBook, the publisher or someone on behalf of the publisher, can add a new rights expression named "tax." Such a new rights expression can be added into a schema of the publisher, and referencing the XrML core schema as a base. Advantageously, this allows the use of all the rights expressions of XrML schema along with the new rights expression of the publisher.

Figure 5:
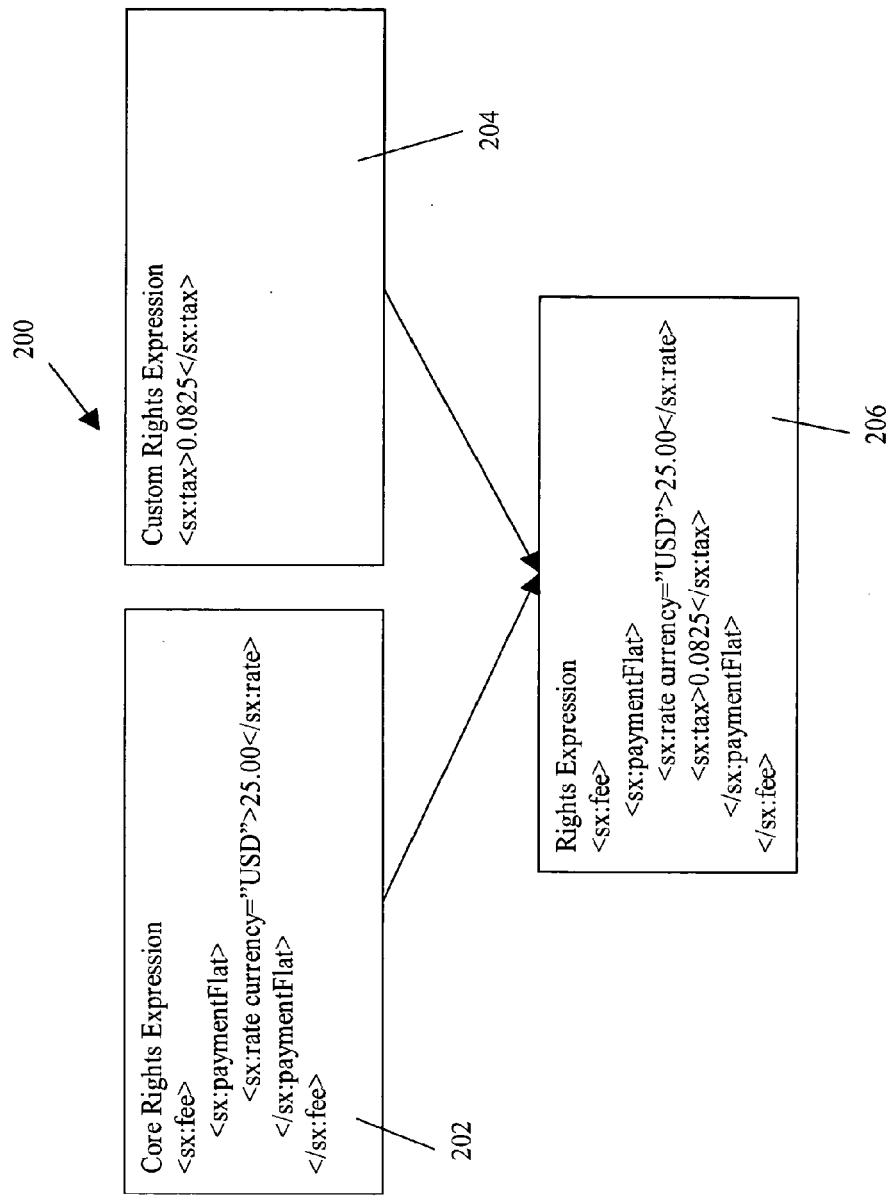
FIG. 5 is a diagram for illustrating generation of a rights expression using rights expressions as inputs, according to an exemplary embodiment.

FIG. 5 is a diagram 200 for illustrating generation of a rights expression using rights expressions as inputs, according to an exemplary embodiment. In FIG. 5, the ability to allow manipulation of the rights expressions is clearly illustrated, wherein a new custom rights expression 204 is combined with a core rights expression 202. The new custom rights expression 204 recites <sx:tax>0.0825</sx:tax> setting forth the rate of tax to be applied. The core rights expression 202 sets forth the fee for the eBook. The combining of the core rights expressions 202 and the custom rights expressions 204 results in the generation of the combined rights expression 206 in which the fee and the tax is set forth. Thus, advantageously, the exemplary rights expression processing system 10 can be extended to generate the new combined rights expression 206.

Such extensible capability is made possible by the abstraction of the parser 14 and the other components of the rights expression processing system 10. As shown in FIG. 1, for example, the parser 14 can be separated from the other components of the exemplary rights expression processing system 10 by the framework 12. Each component, thus, communicates with the parser 14 through the framework 12 so that, for example, direct communication between the various components need not be employed. Advantageously, this allows for a standardized interface, allowing additional components, such as the plug-in subcomponents 18 and/or the validators 20 to be added to the exemplary rights expression processing system 10. Thus, each added component can perform its intended action, by communicating with the framework 12 in performing its actions.

Accordingly, in FIG. 5, a new component, such as an interpreter 16 with plug-in subcomponents 18 and/or a validator 20, can be added to the exemplary rights expression processing system 10. The new component can be configured to understand the tax expression provided in the rights expressions 204, and can work with the parser 14, via the framework 12, to evaluate and/or validate the combined rights expression 206 that incorporates the new "tax" element. The parser 14 can query the framework 12, for existence of a component in the exemplary rights expression processing system 10 that can evaluate and/or validate the "tax" element of the rights expression 204. The framework 12 can then locate the required component(s) and ask the component(s) to perform some action, such as validating the syntax or associated data that accompanies it. To the extent that components of the exemplary rights expression processing system 10 do not have the capability to process the new "tax" element, components configured to process the new "tax" element can be provided to the exemplary rights expression processing system 10 in any suitable manner. With the new components, the rights expression 206 can be properly processed by the exemplary rights expression processing system 10. Advantageously, the exemplary rights expression processing system 10, thus, is truly extensible to handle various types of existing and new rights expressions.

In an exemplary embodiment, the modification process stage 120 of the lifecycle 100 entails taking existing rights expressions in some form, and modifying them in some way to produce a new and/or enforceable set of rights expressions. This is a very desirable feature, as will be evident from the eBook example, wherein the publisher of the eBook will likely prefer to avoid having to generate a new set of rights expressions for each and every customer. Such a process would be not only time consuming, but tedious as well. One possible solution and an area of extensibility within the modification process stage 120, is for the publisher to generate rights expressions during the generation process stage 110, but leave out the data that distinguishes one set of enforceable rights from another. Such data can be, for example, the key that identifies the principal(s) authorized to use the eBook.

The location in the rights expressions where the principal is designated can include a placeholder or a "token" that would allow data to be merged with the rights expressions, resulting in enforceable rights expressions.

Figure 6:
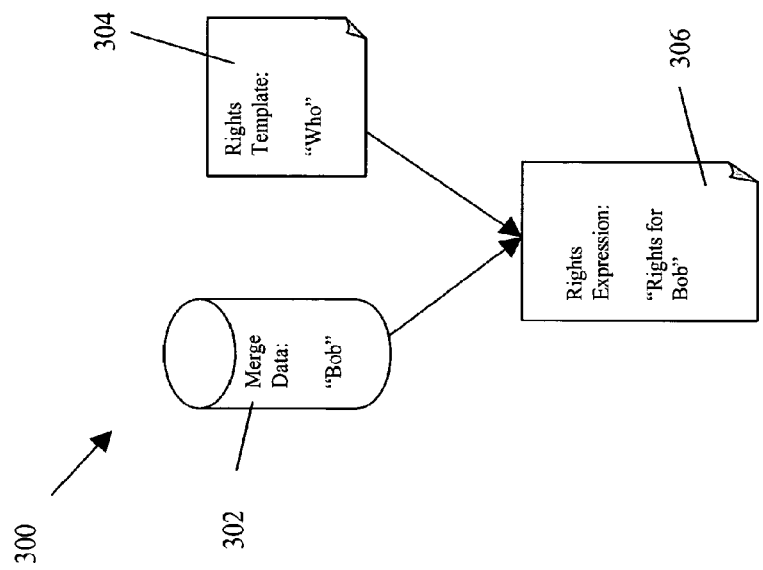
FIG. 6 is a diagram for illustrating a rights expression modification process in the rights expression lifecycle of FIG. 3, according to an exemplary embodiment.

For example, FIG. 6 is a diagram 300 for illustrating the rights expression modification process 120 in the rights expression lifecycle 100 of FIG. 3, according to an exemplary embodiment. In FIG. 6, in the eBook example, the merge data 302 can be the key, which identifies "Bob" as the principal, for example, a person authorized to use the eBook. Such a key is merged with the incomplete rights expression, for example, a rights template 304, resulting in a complete set of enforceable rights 306 for Bob. For example, using XrML, the incomplete rights expressions of the rights template 304 can be set forth in the manner below, prior to the data merge during the rights expression modification process 120:

```
<keyHolder>
    <dsig:keyValue>
        <dsig:RSAKeyValue>
            <cgXrML:CGTOKEN TOKENNAME="<tokenName>" />
        </dsig:RSAKeyValue>
    </dsig:keyValue>
</keyHolder>
```

Once the key data has been merged with the rights template 304, the resulting enforceable rights 306, for example, can be given by:

```
<keyHolder>
    <dsig:keyValue>
        <dsig:RSAKeyValue>
            <dsig:Modulus>
Idvypjad7XoaYhu9tXAYXaENf8li0VvWHBXvs5
nGlySw7exuDOv2olqnNapHtz9OviupzRQ/nEali+6TSRuGsw==
            </dsig:Modulus>
        </dsig:RSAKeyValue>
    </dsig:keyValue>
</keyHolder>
```

Figure 7:
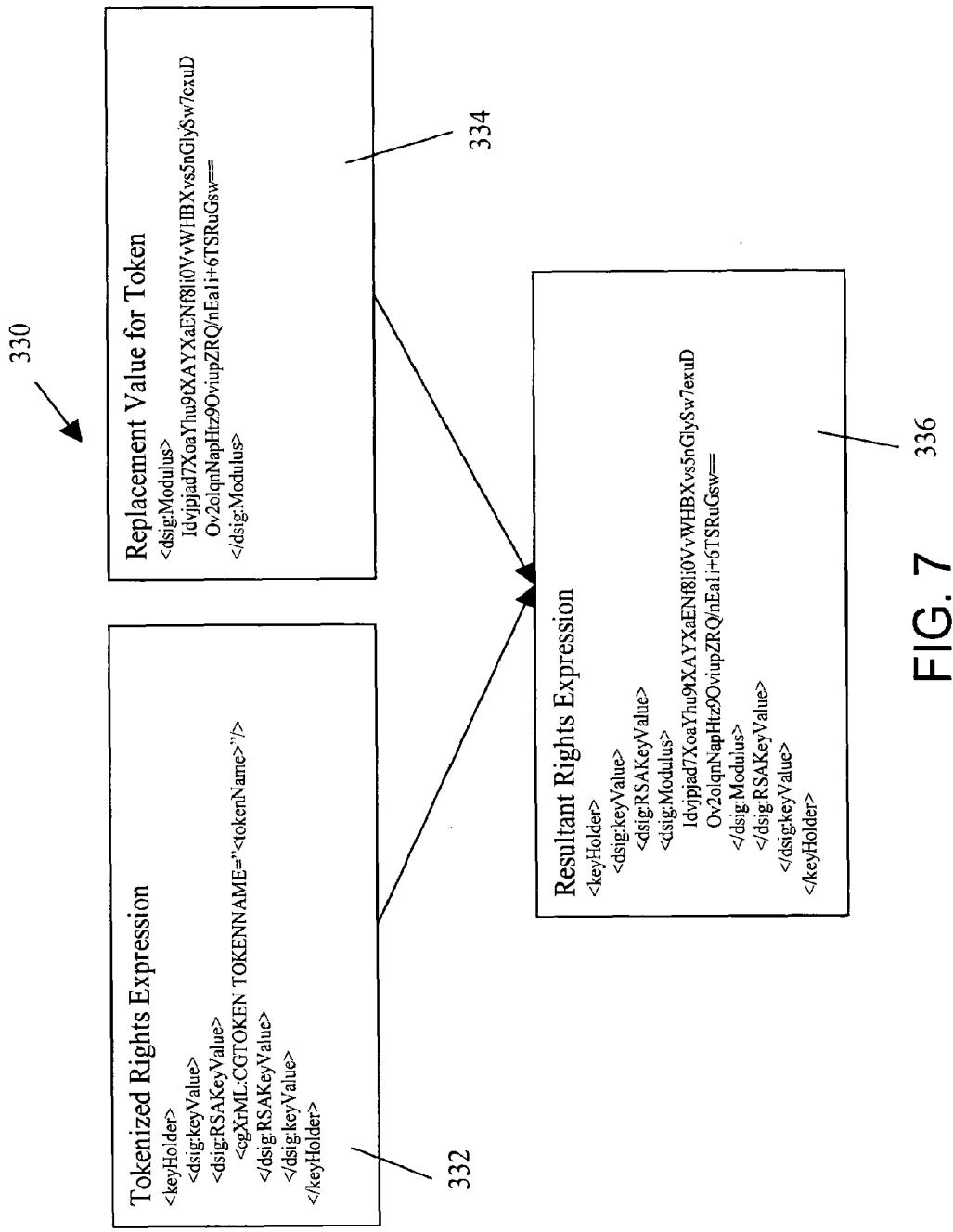
FIG. 7 is a diagram for illustrating modification of a rights expression during a rights expression modification process, according to another exemplary embodiment.

FIG. 7 is a diagram 330 for illustrating modification of a rights expression during the rights expression modification process 120, according to another exemplary embodiment. In FIG. 7, a tokenized rights expression 332, which can include a token that allows data to be merged into the tokenized rights expression 332, can be provided. For example, a line can be provided in the tokenized rights expression 332 that includes the element "<cgXrML:CGTOKEN TOKENNAME="<tokenName>"/>," for example, indicating that entire line is to be replaced with some real data before an enforceable set of rights can be formed. The replacement value for the token in the tokenized rights expression 332 is provided in the replacement value expression 334, which substitutes the replacement value for the token in the tokenized rights expression 332. The resultant rights expression 336, thus, can be formed, and which includes an enforceable set of rights.

In further exemplary embodiments, the rights expressions can be modified during the modification process stage 120 by applying digital signature requirements. Digital signatures can be used to ensure that the contents of a rights expression have not been tampered with. For example, a signature can be used to not only identify the person who signed the rights expression, but also to ensure the integrity of the data within the rights expression. Digital signatures are often a vital part of a Rights Management system, but are not mandatory and use of digital signatures (e.g., W3C's DSIG standard) depends on the level of security needed for the system application. Accordingly, in an exemplary embodiment, a rights expression can be modified to employ such digital signatures to ensure that the contents of the rights expressions have not been tampered with.

The authorization process stage 130 can be one of the most complex process stage in the rights expression lifecycle 100 of FIG. 3, and can entail matching a request to exercise certain usage rights with a set of enforceable rights prescribed in given grant or grants. The authorization process stage 130 can encompass various sub-processes, for example, including grant validation, grant resolution, and grant matching.

Figure 8:
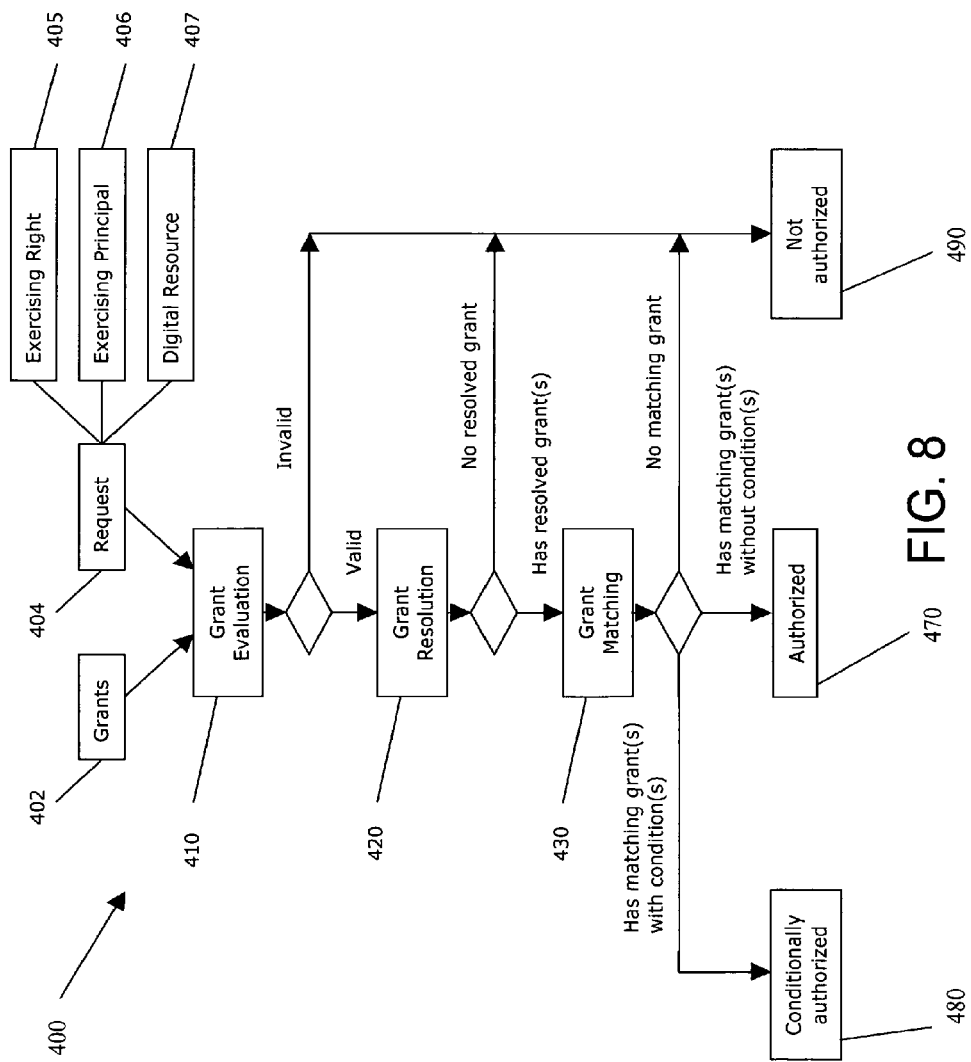
FIG. 8 is a flowchart for illustrating a rights expression authorization process, according to an exemplary embodiment.

FIG. 8 is a flowchart 400 for illustrating the rights expression authorization process 130, according to an exemplary embodiment. In FIG. 8, enforceable grants 402 and requests 404 are used in the authorization process stage 130. The requests 404 can include information regarding exercising of a right 405 desired, identification of an exercising principal 406, and a digital resource 407. The authorization process stage 130 can include grant evaluation 410, grant resolution 420, and grant matching 430 sub-processes. The authorization process stage 130 can result in the request 404 being authorized 470, conditionally authorized 480 or not authorized 490.

Figure 9:
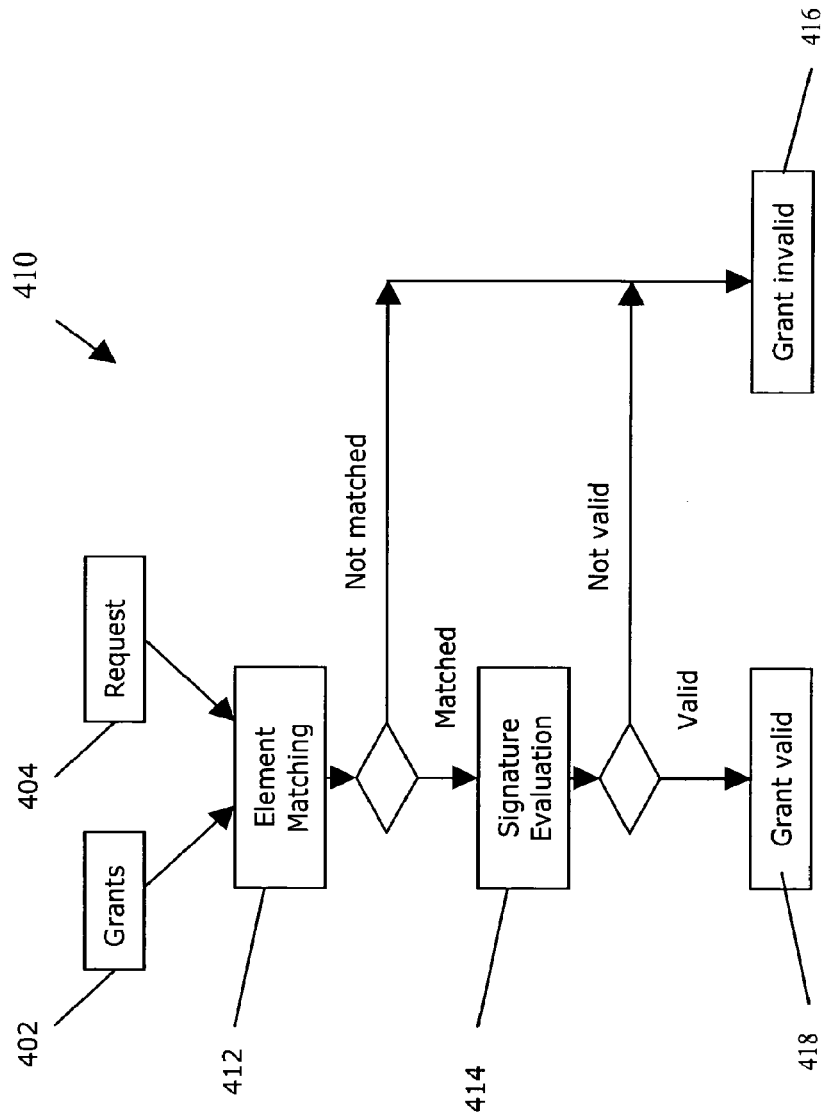
FIG. 9 is a flowchart for illustrating a grant validation process, according to an exemplary embodiment.
Figure 10:
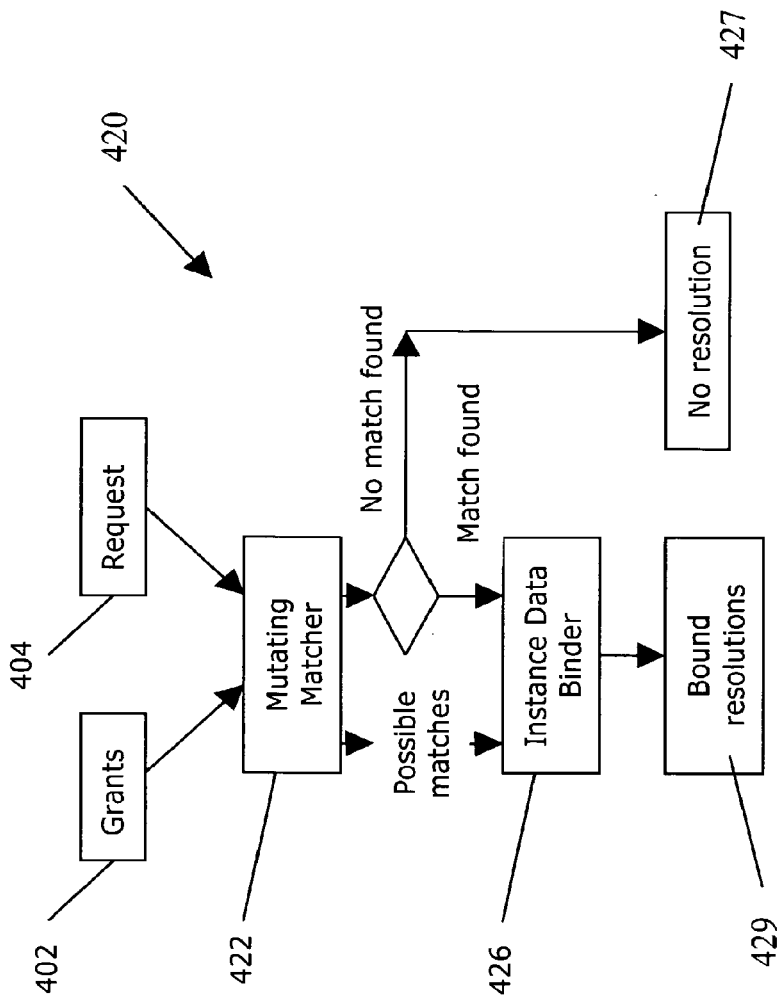
FIG. 10 is a flowchart for illustrating a grant resolution process, according to an exemplary embodiment.

The rights expression authorization process stage 130 and the sub-processes thereof are of an exemplary nature and in further exemplary embodiments such exemplary processes and sub-processes can be suitably altered or otherwise modified. For example, the sub-processes of the authorization process stage 130 can be altered to have different process sequence and steps than as shown in FIGS. 8 to 10 described in detail below. Accordingly, each of the sub-processes also are of an exemplary nature and can be altered to have a different process sequence and steps than as shown. Consequently, the exemplary embodiments are not limited to the illustrated examples.

The sub-process of grant evaluation 410 performs a series of tasks to verify critical elements of the grant 402, for example, including digital signatures, issuer principal(s), digital resources, and exercising right. The sub-process of grant evaluation 410 can be performed by a replaceable component so that rights expressions with new syntaxes and/or semantics can be evaluated. FIG. 9 is a flowchart for illustrating the grant validation process 410, according to an exemplary embodiment. In FIG. 9, grants 402 and a request 404 are evaluated in an element-matching step 412 in order to match various elements of the request 404 with the grants 402. For example, in the element matching step 412, matching elements for various elements, for example, the right, digital resources, digital identities, such as key identifying the principal, and the like, set forth in the request 404 are sought for in the grants 402. If the elements do not match, the grants 402 are deemed invalid in step 416. The exemplary rights expression processing system 10 can be adapted to use plug-in components capable of performing a variety of comparisons to achieve extensibility. Since the element matching step 450 and the supporting sub-components that provide such functionality are implemented as plug-ins, advantageously, new types of matching functions can be designed and implemented to support matching of new types of elements.

If the elements do match in the element matching step 412, the signature evaluation step 414 can be conducted, wherein the digital signature of the grants 402 are evaluated to verify that the grant's integrity is intact. The signature evaluation step 414, for example, also can be performed by using a plug-in component, and the like. Such a plug-in component can be adapted to also deploy pluggable components to perform digital signature evaluation and verification functions, such as cryptography and message digest to maximize extensibility support. If the signature cannot be verified, the grant 402 is deemed invalid in step 416, and in turn, the request is not authorized in step 490 of the authorization stage 130 of FIG. 3. If the signature can be verified, then the grant 402 is deemed valid in step 418.

Figure 11:
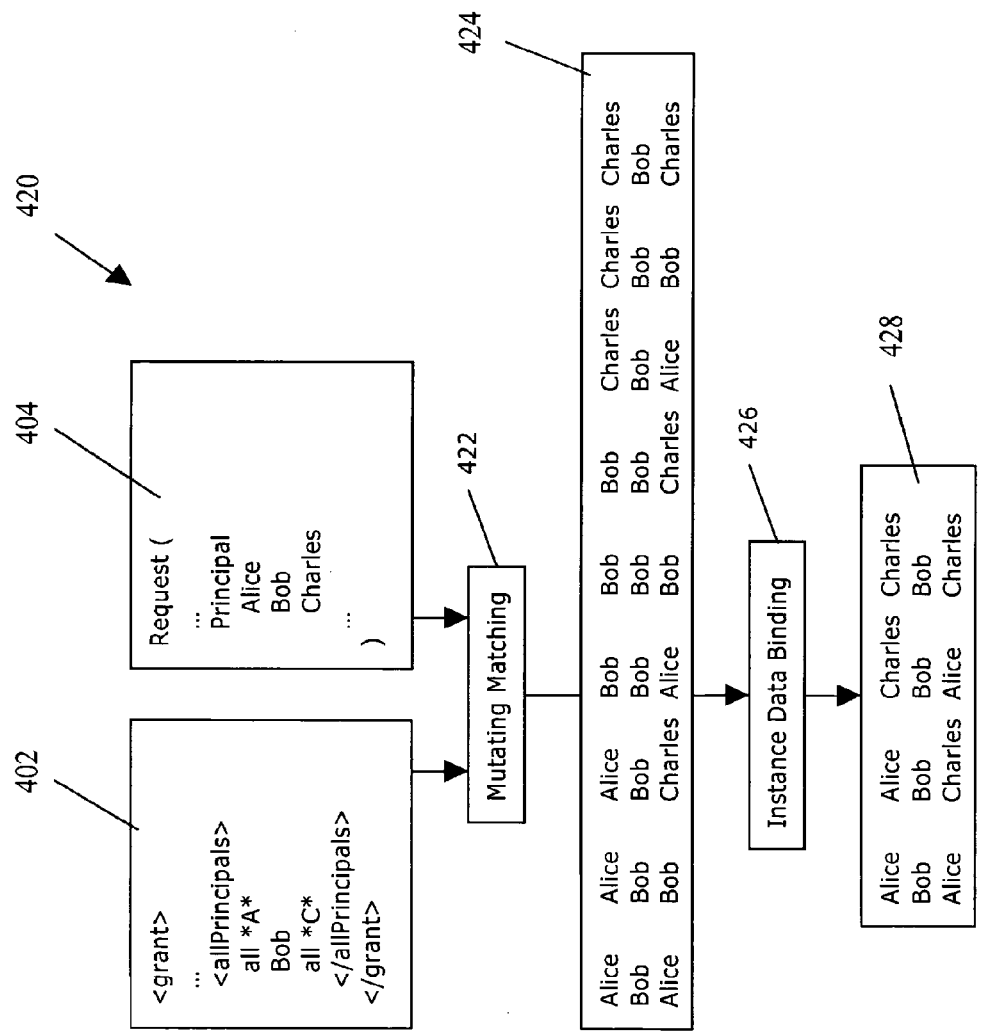
FIG. 11 is a diagram for illustrating the grant resolution process of FIG. 10, according to an exemplary embodiment.

In FIG. 8, once the grants 402 are deemed valid in step 418, the sub-process of grant resolution 420 can be executed to ensure that the elements of the request 404 are matched with the elements of the grants 402. The steps involved in the sub-process of grant resolution 420 of an example embodiment are shown in FIGS. 10 and 11, wherein FIG. 10 is a flowchart and FIG. 11 is a diagram for illustrating the grant resolution process 420, according to an exemplary embodiment.

In FIG. 10, the grant resolution sub-process 420 can includes mutating and matching step 422 in which permutations of the corresponding elements are considered. FIG. 11 illustrates further details of the mutating and matching step 422 and in which the elements of the grants 402 and the request 404 are shown. In FIGS. 3, 10, and 11, the elements of the requests 404 are expanded during the mutating and matching step 422, so that variations and mutations thereof, are provided in the element set 424. If no match is found, no resolution is provided in step 427, and in turn, the request 404 is not authorized in step 490 of authorization process stage 130 of the rights expression lifecycle 100. If possible matches are found, the instance data-binding step 426 is carried out as further described.

In the instance data binding step 426, the variations and mutations of the elements of the request 404 set forth as the element set 424, which may match one or more elements in grants 402, are bound based on the instance data and set apart in the matched and bound element set 428. In FIG. 11, the grant 402 can include elements, for example, wherein the granted principal is listed as including anyone having the letter 'A' in its identity, followed by anyone identified as "Bob," followed by anyone has the letter 'C' in its identity. The request 404 can include the exercising principal as the list "Alice," followed by "Bob," followed by "Charles." The resultant permutations of the elements in the request 404 that allow possible matching are shown in element set 424. The element set 424 need not include all possible permutations of Alice, Bob, and Charles, but rather can include the possible matches with Bob being in the second position, since Bob is not a variable element and must be provided at the second position, as set forth in the grant 402. During the instance data binding step 426, each possible match as set forth in the element set 424 can be evaluated against the rights expressions "all A," "Bob," and "all C," as set forth in the grant 402 to generate the matched and bound set 428, which is indicated as being bound resolutions 429.

The exemplary grant resolution sub-process 420 need not require that the elements of the grants 402 have variables that need be resolved for authorization. For example, the grant resolution sub-process 420 also can be applied to grants that do not require variable resolution as well. The component used to perform the above described sub-processes of mutating and matching 422, as well as instance data binding 426, can be implemented as plug-in components that, advantageously, can be replaced or added to support new rights expression extensions.

In FIG. 8, the grant matching sub-process 430 is then executed and which involves matching each element of the matched and bound set 428 against the evaluated, for example, bound and completely resolved grant(s) that are derived from the grants 402. A grant can be said to be bound and completely resolved, for example, for example, when the variables and expressions have been instantiated and evaluated with data from the grants 402. If there are no matching elements between the grants 402 and the elements of the matched and bound set 428, then the request is not authorized in step 490 of authorization step 130 of the rights expression lifecycle 100 of FIG. 3. The results from the grant matching sub-process 430 can include one or more elements that perfectly match the elements of the grant 402, wherein the request can be authorized accordingly. For example, if the matching elements of the request 404 and the grants 402 do not provide any suitable conditions, authorization is issued without conditions, as shown in step 470. However, if the grants 402 do provide conditions, a conditional authorization is made, as shown in step 480.

Again, it should be kept in mind that the above described processes of FIG. 8 and sub-processes of FIGS. 9 and 10 are of an exemplary nature and can be modified or otherwise altered in further exemplary embodiments to have different process sequences and steps than as shown and described. For example, in the authorization process stage 130, the grant evaluation sub-process 410 having the signature evaluation step 414 can be performed at any suitable time during the authorization process stage 130, for example, before or after grant resolution sub-process 420 and/or grant matching sub-process 430. In further exemplary embodiments, however, other suitable modifications to the processes and sub-processes can be employed.

In FIG. 3, the validation process stage 140 of the rights expression lifecycle 100 can employ the validator 20 to verify the satisfaction of the conditions set forth in the rights expression 104 prior to allowing the consumption of the digital resources identified in the rights expression 104, for example, as described with respect to FIGS. 1 and 2. Accordingly, in the eBook example of the XrML license 50 set forth in Appendix A, the condition rights expressions placed on the use of the eBook are the verification of the user's digital key, and the payment of $25.99. Both of these conditions have to be validated before the associated rights can be granted to the user. The section of the XrML license 50 of Appendix A that defines the required payment is as follows:

```
<sx:fee>
    <sx:paymentFlat>
        <sx:rate currency="USD">25.99</sx:rate>
        <sx:paymentRecord>
            <sx:stateReference>
                <uddi>
                    <serviceKey>
                        <uuid>D04951E4-332C-4693-B7DB-D3D1D1C20844</uuid>
                    </serviceKey>
                </uddi>
            </sx:stateReference>
        </sx:paymentRecord>
    </sx:paymentFlat>
</sx:fee>
```

In this example, the validator 20 processes the $25.99 fee during the validation process stage 140 with a payment service, using the identifier "D04951E4-332C-4693-B7DB-D3D1D1C20844," as designated with the serviceKey sub-element. Once the payment has been authorized, the validator 20 returns a positive result, thereby, indicating compliance with such a condition of the grant. Once the other conditions have been validated by the validator 20, for example, in a similar manner, the associated rights set forth in the grant are granted to the user. In this example, in the license 50 set forth in Appendix A, the rights are as follows:

```
<!--The right to play (view) is granted-->
<grant>
    <cx:digitalWork>
        <cx:locator>
            <cx:nonSecureIndirect URI="http://www.contentguard.com/samples/eBook" Type="URL" />
        </cx:locator>
    </cx: digitalWork >
    <cx:play/>
</grant>
<!--The right to print is granted-->
<grant>
    <cx: digitalWork >
        <cx:locator>
            <cx:nonSecureIndirect URI="http://www.contentguard.com/samples/eBook" Type="URL" />
        </cx:locator>
    </cx: digitalWork >
    <cx:print/>
</grant>
<!--The right to copy is granted-->
<grant>
    <cx: digitalWork >
        <cx:locator>
            <cx:nonSecureIndirect URI="http://www.contentguard.com/samples/eBook" Type="URL" />
        </cx:locator>
    </cx: digitalWork >
    <cx:copy/>
</grant>
</grantGroup>
```

The exemplary embodiments can be employed with a Rights Management System utilized to specify the usage rights for content or other items and to enforce such usage rights. Content can include digital works, such as music, audio files, text files, books, reports, video, multimedia, pictures, executable code or any suitable combination thereof. Various implementations of Rights Management Systems and rights associated with digital content, for example, are described in U.S. Pat. No. 5,629,980, U.S. Pat. No. 5,634,012, U.S. Pat. No. 5,638,443, and U.S. Pat. No. 5,715,403. Hence, the details of Rights Management Systems are not discussed specifically herein. As evident from these references, however, a Rights Management system can take many forms, and can employ varying levels of complexity depending on the security required, the nature of the thing being managed, the complexity of associated rights and conditions, volume and other factors.

Figure 12:
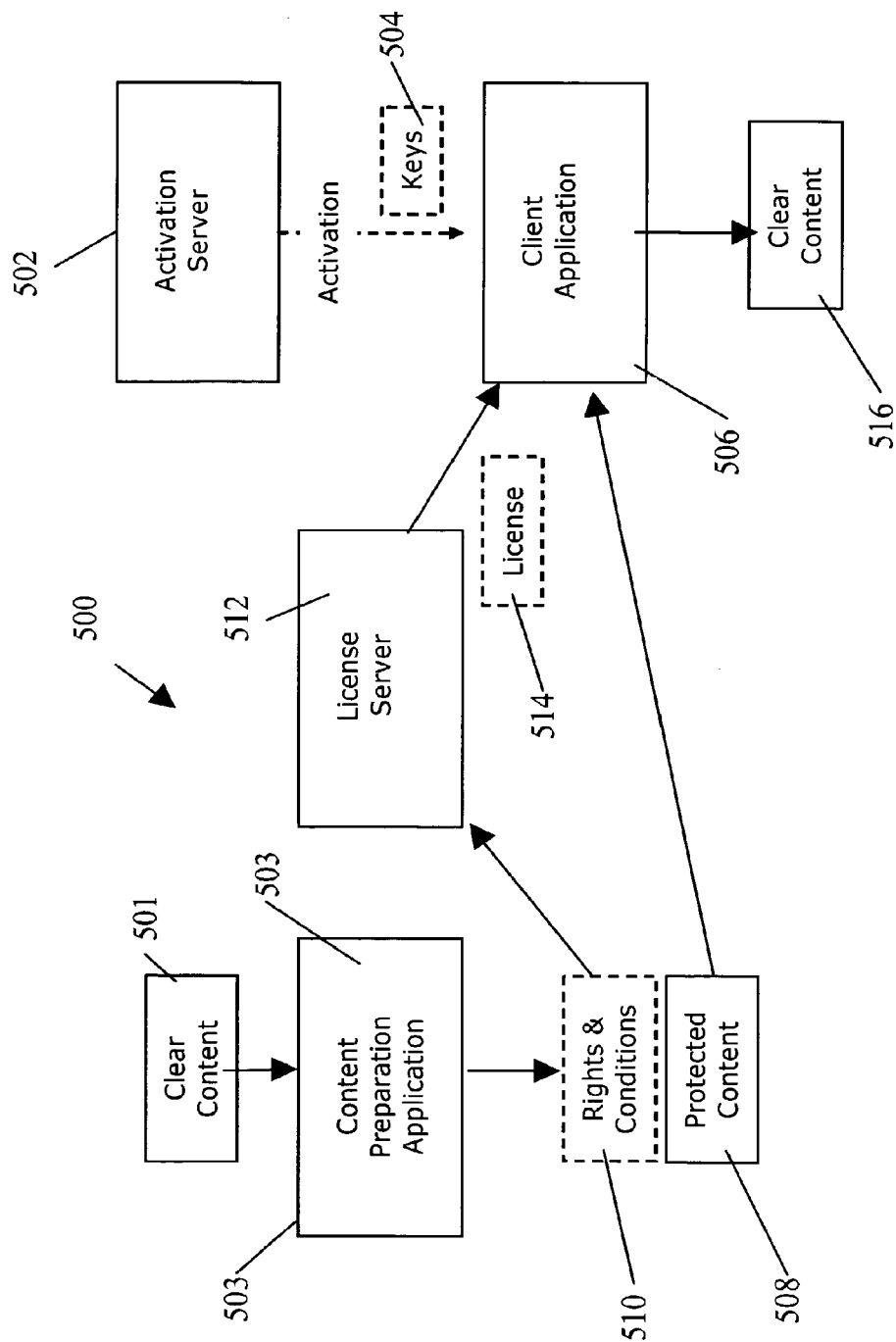
FIG. 12 is a diagram for illustrating a Rights Management system that can be employed with the exemplary embodiments.

FIG. 12 is a diagram for illustrating a Rights Management system that can be employed with the exemplary embodiments. In FIG. 12, the exemplary Rights Management system 500, for example, can be used to distribute digital content. Typically, when a user goes through an activation process, information is exchanged between activation server 502 and client application 506, and is downloaded and installed in client application 506. Client application 506 serves as a tamper resistant security component and can include the set of public and private keys 504 that are issued by activation server 502, as well as other components, such as an engine for parsing or rendering protected content 508.

The Rights Management system 500 also includes a content preparation application 503 that protects clear content 501 through encryption or other protective mechanism to thereby provide protected content 508. The content preparation application 503 also specifies usage rights in a rights label 510 that is associated with protected content 508. The rights label 510 can be used to specify usage rights that are available to an end-user when corresponding conditions are satisfied. A rights expression language (REL), such as ODRL, XrML, SAML, XACML, MPEG REL, XML-based languages, and the like, can be used to specify the rights and conditions set forth in the rights label 510. The rights label 510 and the appropriate encryption key that is used to encrypt the clear content 501 is then provided to the license server 512.

The license server 512 manages the encryption keys and issues license 514 that allows exercise of usage rights. For example, rights label 510 can include usage rights for viewing protected content 508, upon payment of a fee of five dollars, and viewing or printing protected content 508, upon payment of a fee of ten dollars. Client application 506 interprets and enforces the usage rights that have been specified in license 514 to provide clear content 516 that can be used by the end user.

The components and modules of the exemplary Rights Management system 500 can be located in one or more than one device. For example, the activation server 502 and the license server 512 could be the same server or other device or plural separate devices. The protected content 508 can be any suitable type of content, for example, including a document, image, audio file, video file, etc. Further details of Rights Management systems are set forth in further detail in the references noted above, and consequently, are not discussed specifically herein.

Thus, Rights Management systems not only protect content, but also enable content owners to manage the sale and use of their content by means of licenses. Licenses include rights expressions to articulate usage rights and to associate usage rights to content. Licenses can be specified for different stages during the life cycle of digital content. For example, when digital content is released to a distributor, licenses can be specified by content owners to limit distribution of the digital content to a particular region or a period of time, to restrict how content can be repackaged, and the like. The licenses themselves can be protected as well, since they are a controlling facet determinative of how content is used. In this regard, licenses are typically digitally signed by the issuers, so that their integrity and authenticity can be verified before being interpreted.

A license typically includes a grant element, a principal element, a right element, a resource element, and optionally, a condition element. In particular, a license can include one or more grant elements, which define the details of the usage rights granted. The one or more grant elements can specify a principal element, a rights element, a resource element and, optionally, a condition element. The principal element identifies a principal (e.g., a user) or a group of principals who is/are granted the right to access or use the protected resources, while the rights element names a specific right (e.g., play, view, print, copy) to be given to the principal with regards to accessing or using the protected resources. The resource element specifies the protected resources, and the optional condition element specifies any suitable conditions that are imposed on the right to use the protected resource.

A license is typically embodied as a rights expression. A rights expression is a syntactically and semantically correct language construct, based on a defined grammar, to convey rights information. As noted, an example of a rights expression language can include ODRL, XrML, SAML, XACML, MPEG REL, XML-based languages, and the like. A rights expression need not be limited to licenses in particular, but rather can include any suitable expressions that can be used by the Rights Management system to convey information. Thus, a rights expression and derivatives thereof can include an expression of licenses, license components and/or fragments thereof, such as the grant element, principal element, right element, resource element, and/or condition element, as well as other appropriate expressions. Moreover, rights expressions can be in a variety of different forms ranging from binary encoded sequences that target resource-constrained applications, to a multi-level REL construct that describes complex rights information for managed distribution of digital resources and rights granting paradigms.

In addition, Rights Management systems can be applied to digital content and other items, such as services, goods, and the like. For example, rights and conditions can be associated with any suitable physical or nonphysical thing, object, class, category, service or other items for which access, distribution, execution or other use is to be controlled, restricted, recorded, metered, charged, monitored or otherwise managed in some fashion. Thus, a Rights Management system can be used, for example, to specify and enforce usage rights and condition for any suitable item, such as content, service, software program, goods etc. In this regard, to extend the concept of rights management to tangible items, an item ticket can be used to associate usage rights with the item.

Figure 13:
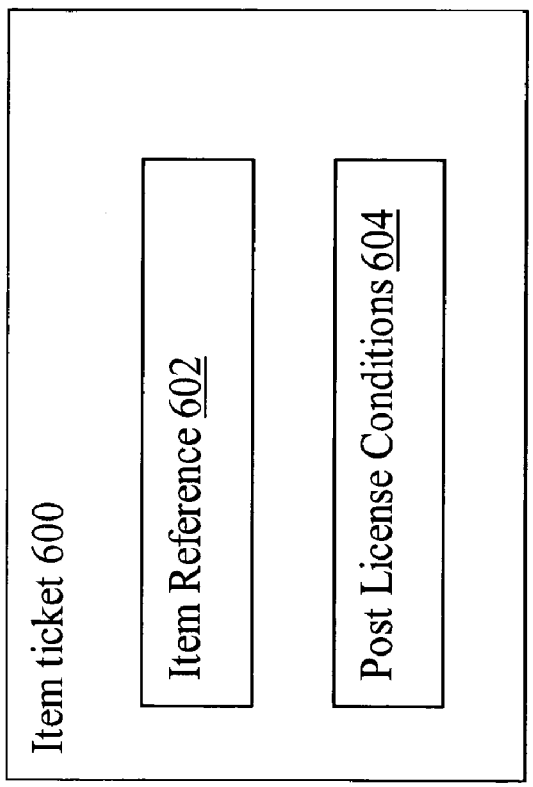
FIG. 13 is a diagram for illustrating an item ticket that can be employed with the exemplary embodiments.

FIG. 13 illustrates an item ticket 600, according to an exemplary embodiment. In FIG. 13, a license or other rights expression can be associated with the item ticket 600, with a ticket specification that points to or otherwise indicates the item ticket. The item ticket 600 can be protected, for example, with a suitable cryptography algorithm or other mechanism for preventing processing or rendering of item ticket 600, except in accordance with an associated license. The item ticket 600, with the security mechanism unlocked can include a human readable or computer readable coupon, a code, a document, and the like.

Accordingly, an item ticket can include any suitable tangible or intangible indication of an item. The item ticket specifies one or more items and thus, usage rights and conditions can be associated with any suitable item including, objects, classes, categories, and services, for which use, access, distribution or execution is to be controlled, restricted, recorded, metered, charged, monitored or otherwise managed in some fashion as previously noted.

In FIG. 13, the item ticket 600 can be prepared by specifying an item reference 602 and any suitable post license conditions 604 that restrict redemption of the item ticket 600. The item ticket 600 can be linked to the item through the item reference 602. Linked can include any suitable type of association, such as a description, a pointer, and the like. For example, the item ticket 600 can include a unique code associated with an item through a database record. When the code is presented to a vendor, the database is searched and the corresponding item can be delivered. Item ticket 600 also can include a human readable description of the item and any suitable post license condition 604 not yet satisfied, such as certain location or time the item ticket 600 can be redeemed. Access to the item 600 can be controlled using a license in the manner described above with respect to content. Further details of Rights Management systems utilizing item tickets are disclosed in U.S. application Ser. No. 10/159,272, entitled "METHOD AND APPARATUS FOR DISTRIBUTING ENFORCEABLE PROPERTY RIGHTS," filed Jun. 3, 2002, the entire disclosure of which is hereby incorporated by reference herein.

Regardless of the details of the item, and whether the item is a digital content, an object, a class, a category, a service or other items, the task of writing valid licenses, and designing and implementing rights expression processing systems is complicated and difficult. Various challenges are encountered in supporting the dynamic aspects of rights expressions and application environments. For example, rights expressions can be static or dynamic. Static rights expressions are statically defined to describe fixed rights information, and therefore, need not be extended. Dynamic rights expressions however, allow new syntaxes to be added without changing the semantics or grammars of the rights expressions. For example, vendors in the wireless content distribution industry can create a new right, such as a "broadcast" right, to grant Rights Management supported distributors the right to "push" rights-managed contents onto subscribers' devices. Constantly changing technology and business paradigms drive the creation of new types of rights. Without an extensible rights expression processing system, different static systems must be designed and implemented to accommodate new rights expression extensions, variations, and derivations thereof.

Thus, the exemplary embodiments can be extensible to allow accommodation of new rights information that is not currently defined at the time the system is designed and implemented. For example, the exemplary embodiments can be implemented using an extensible architecture, so that the exemplary embodiments can be used to generate, modify, authorize, and validate rights expressions, whether the rights expressions are static or dynamic, without the requirement for a redesign of the rights expression or any suitable underlying schema or data dictionary. Such an extensible architecture, advantageously, allows dynamic processing of extended rights expressions and new types of rights expressions.

Further exemplary embodiments, for example, can employ condition processing in a Rights Expression Language (REL), and the like, but can be used in any suitable environment, for example, where access or permission can be granted based on the processing of one or more of the conditions to a satisfied manner. A license coded in a Rights Expression Language can include multiple primitive grants to provide permissions for some entity to exercise a specific right against some resource, possibly subject to some conditions. Examples of rights expression languages are ODRL, XrML, SAML, XACML, MPEG REL, XML-based languages, and the like. A rights expression can include a syntactically and semantically precise language construct based on a defined grammar that conveys rights information. A license is an example of rights expression. A rights expression processing system can generate, manipulate, interpret, and validate rights expressions. A rights expression processing system typically includes an interpreter to evaluate or give semantic meanings to, rights expressions and to validate rights expressions. An interpreter processes a set of rights expressions against a request to determine whether some rights expressions match the request. A matching rights expression is a rights expression that matches the request after the interpretation process. A rights expression processing system is disclosed in the pending U.S. patent application Ser. No. 10/298, 220, wherein the interpreter and the request validation processes described therein can be employed with the exemplary embodiments.

A REL license can include multiple matching rights expressions to provide permissions to exercise a specific right against some resource, possibly subject to some conditions. For example, in an exemplary embodiment, for a given permission request, the interpreter may return multiple matching rights expressions matching the request, which have various sets of condition expressions associated with them. However, to grant the right, only the conditions associated with one of the matching rights expressions must be satisfied. In an exemplary embodiment, a condition is encoded in a rights expression. Although the exemplary embodiments are described in terms of employing a REL, the use of a REL need not be required. In addition, certain trade-off considerations can be employed in deciding which of the matching rights expressions to select for permission granting.

The present invention further includes recognition of a problem, wherein a system, service or device or a consumer may be unable to or unwilling to support certain types of conditions in a rights expressions. For example, an application may not support rights expressions containing fee conditions or an application may not support rights expressions issued by a certain issuer. Accordingly, in an exemplary embodiment, such unsupported rights expressions can be filtered out of a list returned by the interpreter. The exemplary embodiments further support processing of complex conditions, such as to grant permission to a device that is to be operated within a certain territory (for example, country, state, county or city), wherein the device is outside of the territory, to grant permission if a consumer posses a certain credentials or qualifications, such as a club membership or a role in an organization, wherein the consumer does not possess such credentials or qualifications.

The present invention further includes recognition of a problem, wherein enforcing a condition expression can incur significant fees or other costs to the consumer. The exemplary embodiments, thus, can process various fees and costs, including non-monetary considerations, such as frequent flyer miles, an agreement to join a club, an agreement to watch (e.g., click through) commercials, filling out surveys, and the like. Advantageously, exemplary embodiments can increase efficiency, for example, by analyzing, evaluating, and/or ranking the costs of satisfying all of the suitable conditions within each matching rights expression to identify and select the most cost effective matching rights expression to use in granting a permission. Such analysis, evaluation and ranking can be performed prior to or during the granting permission process. The analysis, evaluation, and ranking processes also can be performed in real-time, such that results thereof can be updated on regular basis.

The exemplary embodiments can further handle a consumer that may have a preference on certain conditions. Such preferences may be subject to change, for example, based on time, location or other factors or may need to be expressed in an interactive manner. For example, the consumer may weigh airline frequent flyer miles at $1 for very 100 miles, at the beginning of the year, and $1 for every 50 miles, because the consumer is accumulating the miles for a European vacation. Advantageously, the exemplary embodiments can handle these and other situations.

The present invention further includes recognition that there currently is no easy way for an application to address the above-noted problems. For example, an application can either pick the first matching rights expression or randomly pick a matching rights expression from the set returned by the interpreter. However, such a method may either select a matching rights expression, including unsupported condition expressions or select one that is not cost effective or not preferable to the consumer. An alternative is for the application to have built-in capabilities to analyze the matching rights expressions returned by the interpreter. However, this requires each application to comprehend and process condition expressions and the matching rights expressions. This requirement puts a heavy burden on the application, because it is beyond the application's domain of expertise to understand the semantics of rights expression and analyze them.

To address the above and other problems, the exemplary Configurable Condition Processing System (CPS) can provide condition processing that includes, for example, filtering, weighting, prioritizing, and the like, processes for granting access or permission to an item. The exemplary processes, advantageously, can be employed for enabling a system, service, device, consumer, and the like, to effectively select a matching rights expression to grant an access or permission request to an item. In addition, the exemplary filtering, prioritizing, and weighting, and the like, processes, can be configured so as to be independent of a grammar-based rights expression languages (RELs), such as ODRL, XrML, SAML, XACML, MPEG REL, XML-based languages, and the like. Accordingly, any suitable rights expression language can be employed in the exemplary embodiments to specify a rights expression, including any suitable construct, which can be used to expresses rights.

Figure 14:
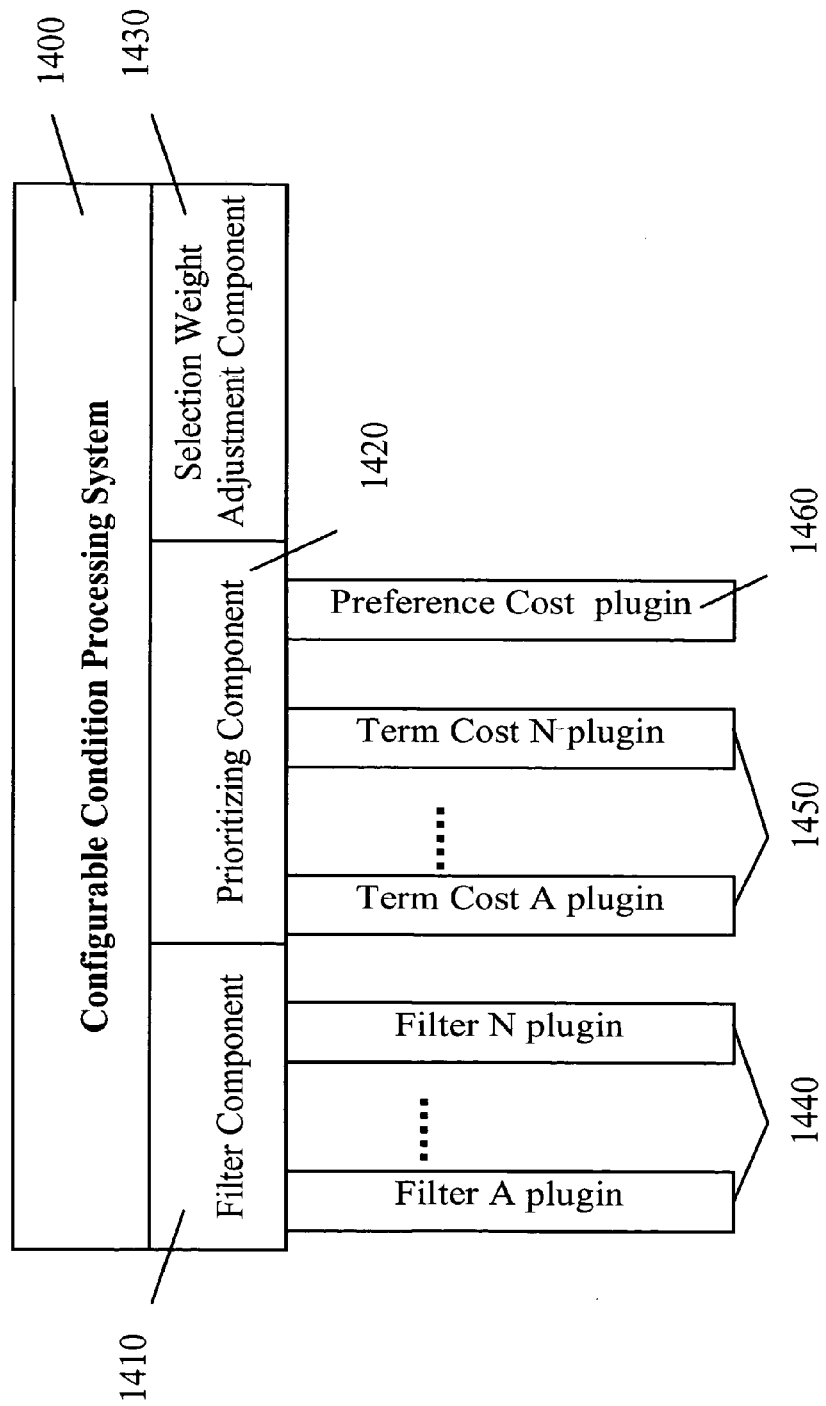
FIG. 14 is a diagram illustrating a Configurable Condition Processing System that can be employed with the exemplary embodiments.

FIG. 14 is a diagram illustrating a Configurable Condition Processing System 1400 that can be employed with the exemplary embodiments. In FIG. 14, the exemplary CPS 1400 can include a Filter Component 1410, for example, configured to direct filtering of conditions with a set of filter plug-ins 1440, and wherein the filter conditions can be based on configurable criteria.

In an exemplary embodiment, a plug-in can include a software module, which can be downloaded, installed or configured to function together within a system or services. In a further exemplary embodiment, a plug-in also can include a cartridge to plug into a device. The instantiation of a plugin within a system, service or device can augment or change the behavior of such a system, service or device. A plug-in can be one of the means to configure a system, service or device of the exemplary embodiments. In further exemplary embodiments, however, other means can be employed, for example, including a configuration file, a configuration utility, a configuration user interface, and the like.

The exemplary CPS 1400 can include a Prioritizing Component 1420 (PCOM), for example, configured to compute the usage cost for each condition and can prioritize such conditions based on usage costs. In an exemplary embodiment, the PCOM 1420 can employ term cost plug-ins 1450, for example, to calculate the condition term usage cost based on the term of condition expressions. The PCOM 1420 also can employ condition preference cost plug-ins 1460, for example, to calculate the condition preferential usage cost based on user condition preferences. The exemplary CPS 1400 can include a Selection Weight Adjustment Component 1430 (SWAC), for example, configured to adjust a weight index of the condition preferences, based on the user's past selection of conditions and other weight specification and configuration methods.

Figure 15:
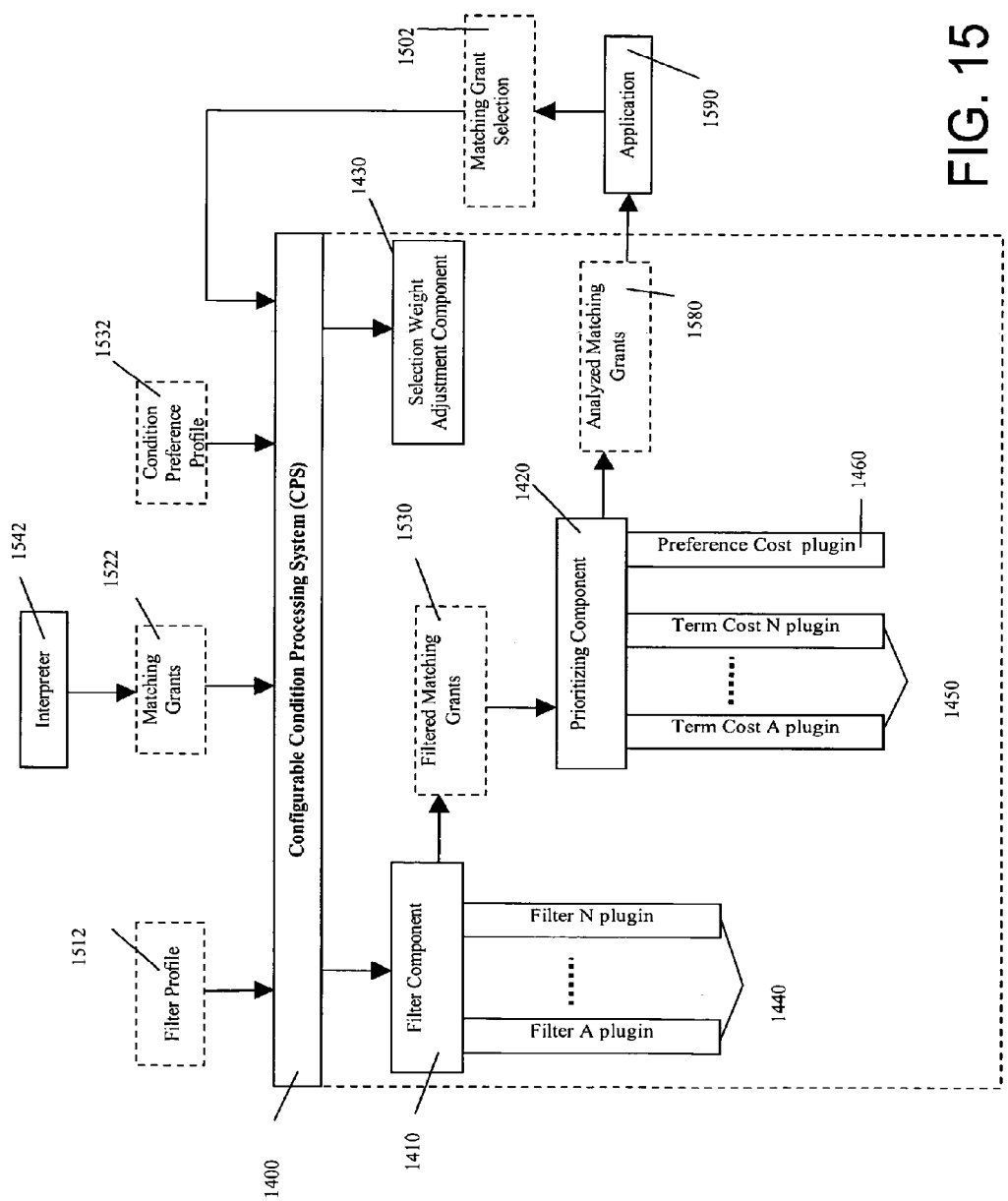
FIG. 15 is a diagram for describing the operation of the Configurable Condition Processing System of FIG. 14, according to an exemplary embodiment.

FIG. 15 is a diagram for describing the operation of the Configurable Condition Processing System 1400 of FIG. 14, according to an exemplary embodiment. Although the exemplary embodiments can employ XrML, as exemplary grammar-based REL, further exemplary embodiments can employ any other suitable RELs. In FIG. 15, an interpreter 1542 can be employed to validate a request from an application 1590 and return a set of matching rights expressions, for example, matching grants 1522 in the exemplary REL XrML. In an exemplary embodiment, the XrML grant can include an expression for a specific right, and optionally can include expressions for the subject or principal to which the right is granted, the resource that the principal is granted the right to act on, and conditions associated with granting the right.

The interpreter 1542 of the CPS 1400 can obtain the set of matching grants 1522 along with a configurable user filter profile 1512 and a condition preference profile 1532 for the analysis process. The CPS 1400 passes the set of matching grants 1522 through the filter component 1410 to get a set of filtered grants 1530. The filter component 1410 controls the process of iterating the set of matching grants 1522 over the set of registered filters 1440. Each of filters 1440 that implements the rights expression filter interface 1410 decides whether to keep a grant or exclude it from the set of matching grants 1522 to generate the set of filtered grants 1530. The filter criteria that each filter 1440 uses can be specified in the configurable user filter profile 1512.

In an exemplary embodiment, any of the filters 1440 can be configured as a plug-in application. The user filter profile 1512 enables each user to specify the criteria for filtering out undesirable grants. The user filter profile 1512 can include filter criteria, such as rights expression type, minimum value, maximum value, rights expression type operator, minimum value operator, maximum value operator, and the like. In further exemplary embodiments, such filter criteria need not be employed and any other suitable filter criteria can be used. Table 1 describes the exemplary filter criteria.

TABLE 1

Filter Profile Criteria

| Criteria Field Name | Definition | Example | Comment |
| --- | --- | --- | --- |
| Rights expression type | Type expression name to use with the specified rights expression type operator to evaluate against authorized rights expressions. | FlatFee | Filtering against FlatFee type within authorized rights expression. |
| Filter type operator | Operator for use in conjunction with the specified rights expression type. Valid operators include: =, !=, and custom defined FilterTypeEval( ). | = | Filter out authorized rights expression including FlatFee. |
| Minimum filter name value pair | Optional minimal value of the given name within the specified rights expression type to further limit the minimum range. | FlatFee, 1 | Minimum FlatFee's Fee value of 1. |
| Maximum filter value | Optional maximum value of the given name within the specified rights expression type to further limit the maximum range. | FlatFee, 5 | Maximum FlatFee's Fee value of 1. |
| Minimum filter value operator. | Operator for use in conjunction with minimum filter value. Valid operators include: =, !=, <, >, <=, >=, and custom defined FilterValueEval( ). | < | Filter out authorized rights expression including FlatFee with Fee value less than 1. |
| Maximum filter value operator. | Operator for use in conjunction with maximum filter value. Valid operators include: =, !=, <, >, <=, >=, and custom defined FilterValueEval( ). | > | Filter out authorized rights expression including FlatFee with Fee value greater than 5. |

The exemplary embodiments can employ a flat fee condition and a territory condition, wherein a flat fee condition can require that a principal to pay a specified flat amount of fee prior to exercising a corresponding right, and a territory condition can require that a principal has to be within a specified location during the exercising of a corresponding right.

Any suitable number of algorithms for comparing the filter criteria with a grant can be employed. In an exemplary embodiment, such implementation, for example, can be defined by the filter component 1410. A grant and its associated chain of grants can be referred to as a grant path. The filter component 1410 can recursively apply the filtering process to each grant within the grant path on each filter plug-in 1440. If one of the grants on a grant path matches the filter criteria for exclusion, the whole grant path is excluded from the matching filtered grants set 1530.

The CPS 1400 passes the filtered matching grants 1530 to the PCOM 1420. The PCOM 1420 computes the grant usage cost for each grant path and prioritizes the grant paths based on their usage costs, via the plug-ins 1450 and 1460. In an exemplary embodiment, the PCOM 1420 customizes the calculation of condition usage cost. For example, for a condition type, the condition term cost plug-in 1450 implements the condition term interface for that condition type to accurately calculate the condition term usage cost based on the term of the condition. The condition preference plug-in 1460 implements the condition preference interface to calculate the condition preferential usage cost based on the user preference profile 1532.

In an exemplary embodiment, the condition term interface defines a standard way to calculate the condition term usage cost, for example, based on the term of the condition and to output the usage cost in units that the PCOM 1420 can process. This enables the PCOM 1420 to compare relative usage costs among conditions of the same type, such as a $5.00 flat fee condition versus a $10.00 flat fee condition. The criteria for determining a condition's actual usage cost can vary for each condition type. In an exemplary embodiment, the condition term cost plug-in 1450 can be used to implement a cost calculation algorithm in any suitable manner, for example, such that a condition with a lower usage cost gets a low usage cost score. For example, given a flat fee condition with a fee of $5.00, a FlatFeeCalcCondTermUsageCost plug-in can calculate a usage cost score of 5, wherein a larger flat fee amount results in a larger usage cost score.

In a further exemplary embodiment, given a territory condition, a TerritoryCalcCondTermUsageCost plug-in can assign a high usage cost to a territory condition encompassing a small territory and a low usage cost to a territory condition encompassing a larger territory. For example, a territory condition restricted to California can get a usage cost score of 10, while a territory condition encompassing the USA can get a usage cost score of 5. Based on the above examples, and assuming that all other suitable factors for consideration are equal, a grant including a small amount for a flat fee condition and a territory condition encompassing a large region can be ranked higher than a grant including large amount for a flat fee condition and a territory condition restricted to a small region.

In an exemplary embodiment, the condition preference interface defines a standard way to calculate the condition usage preference based on the user preference profile 1532. The profile 1532 can be that of any suitable user. For example, a user can be someone in the role of a buyer or of a seller or an application 1590. This enables the PCOM 1420 to compare relative usage costs among conditions of different types, such as a flat fee condition versus a per use fee condition. In an exemplary embodiment, the user preference profile 1532 can include a prioritized list of condition type name and positive rank score value pairs, where the condition type that the user prefers most has the highest rank score, and the condition type that the user prefers least has the lowest rank score. The user can assign different condition types the same rank score to indicate a same preference for those conditions.

The condition preference cost plug-in 1460 that implements the condition preference interface, returns a low preference usage cost score for a condition with a high rank score and a high preference usage cost score for a condition with a low rank score. For example, a low preference usage cost score for a condition indicates a high preference to use the condition. In an exemplary embodiment, all suitable condition types that are not on the list are evaluated to be equal in preference, and the plug-in 1460 returns a higher usage cost score for these condition types than for condition types that are in the prioritized list of condition preference.

In an exemplary embodiment, the Selection Weight Adjustment Component (SWAC) 1430 assigns a selection strength index to each condition type specified in the user preference profile 1532. The selection strength index represents the user's affinity to such a condition type based on past selections of matching rights expression 1502 for exercising. In an exemplary embodiment, the selection strength index fine-tunes the preference usage score based on previous user selections.

The more times a condition type appears in the user's selection of authorized rights expressions for exercise, the higher its selection strength index. In an exemplary embodiment, and to ensure that the selection strength index value reaches a maximum at a certain pace but does not exceed that maximum, a horizontal asymptotic function is applied to produce an asymptotic selection strength index.

Figure 16:
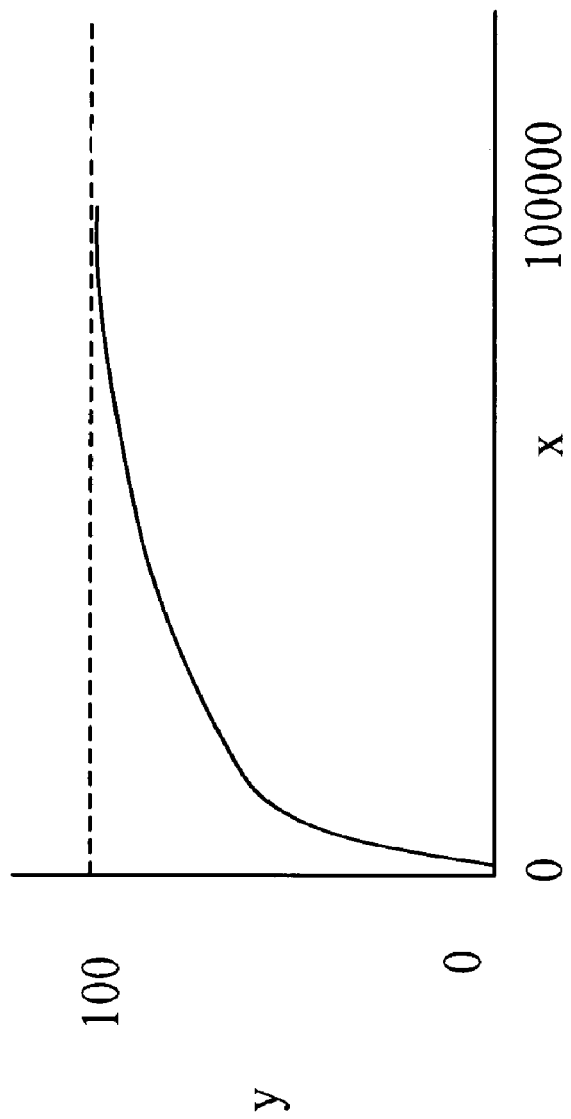
FIG. 16 is a graph illustrating a horizontal asymptotic function for $y=100*x^2/(x^2+100*x)$ that can be employed with the exemplary embodiments.

FIG. 16 is a graph illustrating a horizontal asymptotic function for $y=100*x^2/(x^2+100*x)$ that can be employed with the exemplary embodiments. In FIG. 16, the choice of such horizontal asymptotic function depends on the desired maximum and the desired pace for the asymptotic selection strength index to reach such a maximum, wherein:

y=asymptotic_selection_strength_index, and x=selection_strength_index, where:

$y=100*x^2/(x^2+100*x)$

The exemplary function has a horizontal asymptote of 100, as shown in FIG. 16. Using the exemplary horizontal asymptotic function, advantageously, enables the system of the exemplary embodiments to gradually increase the selection strength index and to restrict it to less than 100, so the selection strength index does not become an overly dominant factor in the exemplary condition usage rank calculation.

In an exemplary embodiment, for each grant, the PCOM 1420 retrieves the associated conditions and computes a Condition Usage Rank (CUR) score for each condition by combining the term usage cost score from the condition term cost plug-in 1450, the preference usage cost score from the condition preference plug-in 1460, and the exemplary asymptotic selection strength index. For example, the preference usage cost score and selection strength index give weight to the term usage cost score.

In an exemplary embodiment, a highly preferred condition type causes the preference usage cost score to lower its term usage cost score more than a less preferred condition type. Similarly, a high asymptotic selection strength index lowers its term usage cost score more than a low asymptotic selection strength index. In an exemplary embodiment, the formula for combining the two usage cost scores to get the CUR, for example, can be given by:

CUR=usage_cost_score*preference_usage_cost_score*1/asymptotic_selection_strength_index The PCOM 1420 then combines the CUR scores for the conditions within a grant to determine a Rights Expression Usage Rank (REUR) score. Since each grant can have additional grants resulting from chaining, the PCOM 1420 recursively computes the REUR for such grants. For each grant path, the PCOM 1420 combines the REUR scores for the grants belonging to a chain to determine a Rights Expression Path Usage Rank (REPUR) score. The grant path with the lowest REPUR score has the potential to be the most cost effective grant path to use.

In an exemplary embodiment, the PCOM 1420 can be configured to return only the grant path with the lowest REPUR score or to return the n lowest REPUR score grant paths. In an automated environment, the former configuration can be employed, because the grant path with the lowest REPUR score automatically gets selected for exercise. The selection strength index need not employ an adjustment in such a case.

In an interactive environment, according to a further exemplary embodiment, it can be more useful to return the n lowest REPUR score grant paths, so that the user can review the result and make a final selection of the grant path for exercise. If the user selects the lowest REPUR score grant path, no additional processing need be employed. However, if the user selects one of the other grant paths, the CPS 1400 can be configured to fine tune the user preference profile 1532 so that future requests will yield a grant path with the lowest REPUR score that better matches the user's actual preference based on past selections.

To fine-tune the user preference profile 1532, the SWAC 1430 analyzes the grant path 1502 selected by the user. For each condition type that appears in the selected grant path 1502, the SWAC 1430 checks whether that condition type exists in the user preference profile 1532. If so, the SWAC 1430 increments its selection strength index so as to strengthen its preference. For each condition type that appears in the selected grant path 1502, but does not have a corresponding entry in the user preference profile 1532, the SWAC 1430 can increment an auto-create condition type counter associated with the condition type. When an auto-create condition type counter reaches a configurable threshold value, the SWAC 1430 can automatically create a new entry in the user preference profile 1532 for the condition type associated with the auto-create condition type counter and assign a positive rank score value that indicates medium preference for the condition type.

Advantageously, the above features enable the CPS 1400 to compare relative usage cost among conditions even when the user does not provide an initial user preference profile. In such a situation, the SWAC 1430 can automatically create the user preference profile 1532 and automatically add entries to the prioritized list of condition preference when auto-create condition type counters reach their threshold value. The preference usage score for such automatically created entries also can be fine-tuned through the use of selection strength index, as described above. To ensure that the selection strength index gradually exerts its influence on the preference and that it does not dominate CUR calculation, the exemplary horizontal asymptotic function can be applied to the selection strength index when calculating the CUR score.

In an exemplary embodiment, a user can change the preference list and cost/weight of each parameter at the beginning and/or in the middle of processing, periodically, for example, by periodically asking the user, for example, using a dialog on the monitor of computer. In a further exemplary embodiment, an initial set of default values can be employed, as well.

In an exemplary embodiment, if n-dimensional parameters are employed, then optimization in n-dimensional space can be employed, for example, using hyper-planes as threshold for each condition or parameter. The exemplary processes can be very subjective, wherein changes can occur from person-to-person or by time for the same person. Accordingly, the preferences, the list, and the costs can be dynamic parameters that are constantly changing. Using a training scheme, for example, based on a neural network, can be very helpful for predicting future preferences of the same person or a group of people, to reduce the cost of operation for a case of too many individuals or just to get the trend of preference for a person.

Figure 17:
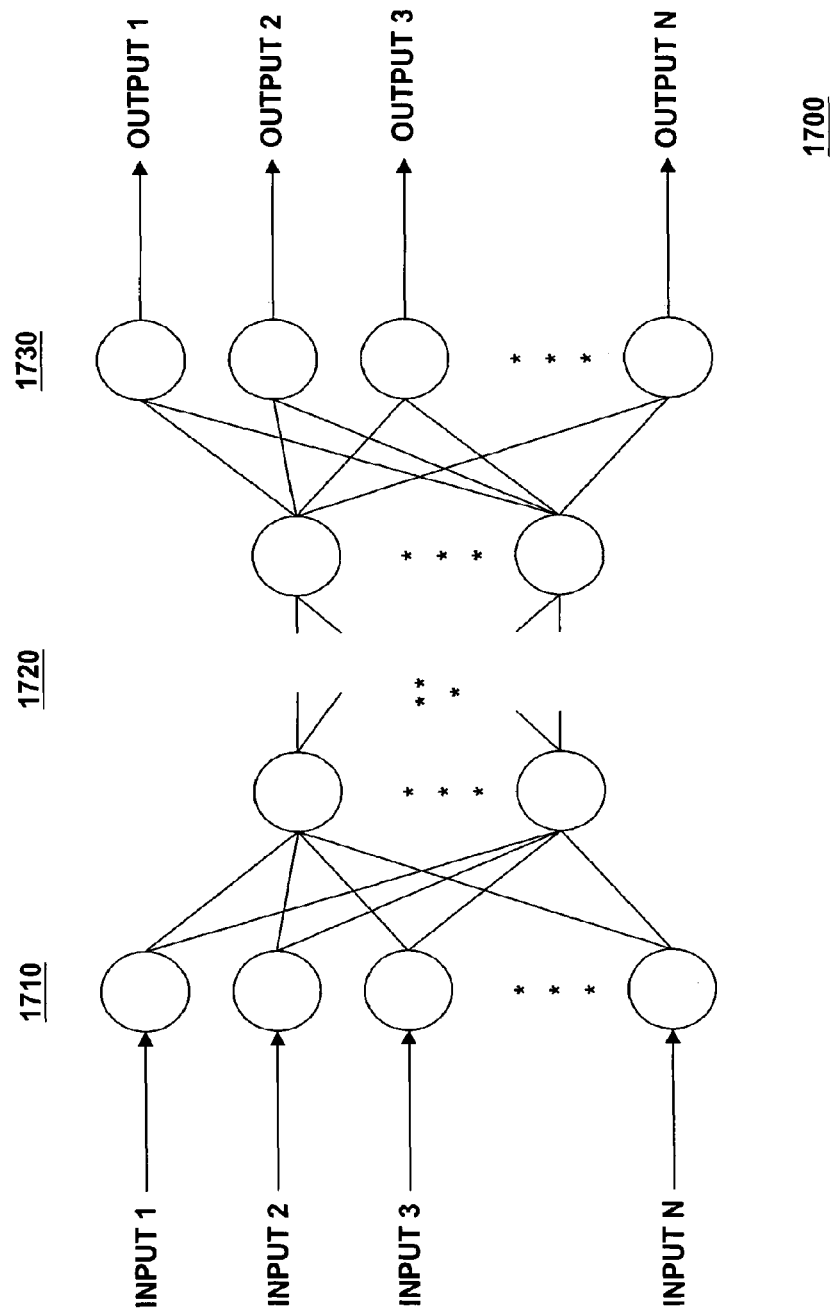
FIG. 17 illustrates a neural network that can be employed with the exemplary embodiments.

FIG. 17 illustrates a neural network 1700 that can be employed with the exemplary embodiments. In FIG. 17, inputs 1710 to the neural network 1700 can include the parameters that affect the decision that is ultimately chosen as given by outputs 1730 of the neural network 1700 based on processing by one or more hidden units 1720. For example, exemplary inputs and desired outputs (e.g., samples 1-100) can be used for training the neural network 1700, subsequent exemplary inputs and desired outputs (e.g., samples 101-200) can be used to verify the neural network 1700, and then actual inputs can be used by the trained neural network 1700 to make predictions on the outputs 1730.

FIG. 18 is a flowchart for illustrating the operation of the Configurable Condition Processing System 1400 of FIG. 14, according to an exemplary embodiment. In FIG. 18, a method, system, device, and/or computer program product can be configured for processing plural rights expressions associated with an item for use in a system for controlling use of the item in accordance with the rights expressions, including, at step 1802, receiving a request to use an item, the item having associated rights expressions governing use of the item. At step 1804, one or more rights expressions including conditions that must be satisfied in order to use the item are returned. At step 1806, the returned rights expressions are processed in a manner to facilitate selection of the returned rights expressions in order to use the item in accordance with the selected rights expressions, for example, including the exemplary filtering processes, weighting processes, prioritizing processes, and the like, of the exemplary embodiments described with respect to FIGS. 1-17. At step 1808, conditions associated with the selected rights expressions in using the item are validated.

The devices and subsystems of the exemplary embodiments can communicate, for example, over a communications network, and can include any suitable servers, workstations, personal computers (PCs), laptop computers, PDAs, Internet appliances, set top boxes, modems, handheld devices, telephones, cellular telephones, wireless devices, other devices, and the like, capable of performing the processes of the disclosed exemplary embodiments. The devices and subsystems, for example, can communicate with each other using any suitable protocol and can be implemented using a general-purpose computer system, and the like. One or more interface mechanisms can be employed, for example, including Internet access, telecommunications in any suitable form, such as voice, modem, and the like, wireless communications media, and the like. Accordingly, communications networks employed can include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like. In addition, the communications networks employed can be the same or different networks.

As noted above, it is to be understood that the exemplary embodiments are for exemplary purposes, as many variations of the specific hardware used to implement the disclosed exemplary embodiments are possible. For example, the functionality of the devices and the subsystems of the exemplary systems can be implemented via one or more programmed computer systems or devices. To implement such variations as well as other variations, a single computer system can be programmed to perform the special purpose functions of one or more of the devices and subsystems of the exemplary systems. On the other hand, two or more programmed computer systems or devices can be substituted for any one of the devices and subsystems of the exemplary systems. Accordingly, principles and advantages of distributed processing, such as redundancy, replication, and the like, also can be implemented, as desired, for example, to increase the robustness and performance of the exemplary embodiments.

The exemplary embodiments can be used to store information relating to various processes described herein. This information can be stored in one or more memories, such as a hard disk, optical disk, magneto-optical disk, RAM, and the like, of the devices and sub-systems of the exemplary systems. One or more databases of the devices and subsystems can store the information used to implement the exemplary embodiments. The databases can be organized using data structures, such as records, tables, arrays, fields, graphs, trees, lists, and the like, included in one or more memories, such as the memories listed above.

All or a portion of the exemplary embodiments can be conveniently implemented using one or more general-purpose computer systems, microprocessors, digital signal processors, micro-controllers, and the like, programmed according to the teachings of the disclosed exemplary embodiments. Appropriate software can be readily prepared by programmers of ordinary skill based on the teachings of the disclosed exemplary embodiments. In addition, the exemplary systems can be implemented by the preparation of application-specific integrated circuits or by interconnecting an appropriate network of component circuits.

Advantageously, that the exemplary rights expression processing system and method of the exemplary embodiments can be used to generate, modify, authorize, and validate grammar-based rights expressions. The exemplary rights expression processing system and method can be implemented with an extensible architecture having extensibility points to allow new syntaxes to be added without changing semantics or grammars of rights expressions to thereby allow accommodation of new rights expressions. Such extensibility, for example, can be realized by implementing the components of the rights expression processing system and method, for example, such as the interpreter and validator components, as plug-in components.

Although the exemplary embodiments are described in terms of an item or resource having an associated rights expression governing use of the item or resource, in further exemplary embodiments a rights expression need not be associated with an item or resource, wherein the rights expression can specify an act to be performed irrespective of an item or resource.

While the present invention have been described in connection with a number of exemplary embodiments and implementations, the present invention is not so limited but rather covers various modifications and equivalent arrangements, which fall within the purview of the appended claims.

APPENDIX A

An exemplary rights expression that grants to a principal or other authorized person the unlimited right to view, print, and copy the subject "eBook," for a flat fee of $25.99, for example, can be given by:

```
<license>
    <grant>
        <grantGroup>
            <dsig:keyValue>
                <dsig:RSAKeyValue>
                    <dsig:Modulus>
ldvypjad7XoaYhu9tXAYXaENf8li0VvWHBXvs5nGlySw7exuDOv2olqnNapHtz9OviupZRQ/nEali+6TSRuGsw==
                    </dsig:Modulus>
                </dsig:RSAKeyValue>
            <dsig:keyValue>
        </keyHolder>
        <!--The right to play (view) is granted-->
        <grant>
            <cx:digitalWork>
                <cx:locator>
                    <cx:nonSecureIndirect URI="http://www.contentguard.com/samples/eBook" Type="URL" />
                </cx:locator>
            </cx: digitalWork>
            <cx:play/>
        </grant>
        <!--The right to print is granted-->
        <grant>
            <cx: digitalWork >
                <cx:locator>
                    <cx:nonSecureIndirect URI="http://www.contentguard.com/samples/eBook" Type="URL" />
                </cx:locator>
            </cx: digitalWork >
            <cx:print/>
        </grant>
        <!--The right to copy is granted-->
        <grant>
            <cx: digitalWork >
                <cx:locator>
                    <cx:nonSecureIndirect URI="http://www.contentguard.com/samples/eBook" Type="URL" />
                </cx:locator>
            </cx: digitalWork >
            <cx:copy/>
        </grant>
        </grantGroup>
        <sx:fee>
            <sx:paymentFlat>
                <sx:rate currency="USD">25.99</sx:rate>
                <sx:paymentRecord>
                    <sx:stateReference>
                        <uddi>
                            <serviceKey>
                                <uuid>D04951E4-332C-4693-B7DB-D3D1D1C20844</uuid>
                            </serviceKey>
                        </uddi>
                    </sx:stateReference>
                </sx:paymentRecord>
            </sx:paymentFlat>
        </sx:fee>
    </grant>
```

We claim:

1. A computer-implemented method for processing plural rights expressions associated with an item for use in a system for controlling use of the item in accordance with the rights expressions, the method comprising:

receiving a request to use the item, the item having associated rights expressions governing use of the item;

returning one or more rights expressions including one or more conditions that must be satisfied in order to use the item; and processing the returned rights expressions in a manner to facilitate selection of the returned rights expressions in order to use the item in accordance with the selected rights expressions, and including:

prioritizing the returned rights expressions based on the one or more conditions of the returned rights expressions, so as to facilitate selection of the returned rights expressions.

2. The method of claim 1, wherein the returned rights expressions specify respective manners of use of the item.

3. The method of claim 2, wherein the item includes one of digital content, a service, an abstract object, a resource, and goods.

4. The method of claim 2, wherein the conditions include conditions that must be satisfied in order to exercise the respective manners of use for the item.

5. The method of claim 1, wherein the prioritizing step further comprises:

employing a usage cost associated with enforcement of a condition of the prioritized conditions, wherein the usage cost includes at least one of a term usage cost associate with the condition, and a preference usage cost associated with a preference for enforcement of the condition.

6. The method of claim 5, wherein the term usage cost includes at least one of a usage cost corresponding to a fee associated with the access to the item, and a territory usage cost corresponding to a territory restriction with respect to the access to the item.

7. The method of claim 5, wherein the prioritizing step further comprises:
employing the usage cost in combination with a preference for the enforcement of the condition.

8. The method of claim 7, wherein the usage cost and the preference are user-configurable.

9. The method of claim 7, wherein the usage cost and the preference are predetermined.

10. The method of claim 7, wherein the usage cost and the preference are initially set to default values.

11. The method of claim 7, further comprising:
prompting a user for values for the usage cost and the preference.

12. The method of claim 7, further comprising:
determining values for the usage cost and the preference based on an output from a neural network trained with previous input values from a user for the usage cost and the preference.

13. The method of claim 7, further comprising:
determining values for the usage cost and the preference based on an output from a neural network trained with previous input values from a plurality of users for the usage cost and the preference.

14. The method of claim 1, wherein the prioritizing step is accomplished with a prioritizing plug-in application.

15. The method of claim 14, wherein the prioritizing plug-in application is configurable on a device.

16. The method of claim 1, wherein the returned rights expressions include a path comprising a chain of rights expressions, and the prioritizing step comprises:
recursively prioritizing each rights expression of the chain of rights expressions.

17. The method of claim 1, wherein the processing step comprises:
filtering one or more rights expressions from the returned rights expressions to facilitate selection of a rights expression.

18. The method of claim 17, wherein the processing step comprises:
prioritizing one or more conditions of the filtered rights expressions to facilitate selection of a rights expression.

19. The method of claim 17, wherein the filtering step is accomplished with a filtering plug-in application.

20. The method of claim 19, wherein the filtering plug-in application is configurable on a device.

21. The method of claim 17, wherein the returned rights expressions include a grant path comprising a chain of grants, and the filtering step comprises:
recursively filtering each grant of the chain of grants of the grant path.

22. The method of claim 1, wherein the returned rights expressions include a grant.

23. The method of claim 1, further comprising:
performing the processing step on a device in order to access the item with the device.

24. The method of claim 23, wherein the device comprises a handheld device.

25. The method of claim 23, wherein the device comprises a rendering device.

26. The method of claim 23, wherein the device comprises a general-purpose computer device.

27. The method of claim 1, wherein the rights expression information is grammar-based.

28. The method of claim 1, wherein the processing step includes at least one of filtering, weighting, and prioritizing steps for granting one of access to the item and permission to use the item.

29. The method of claim 28, wherein the filtering step includes filtering the returned rights expressions based on a filter profile.

30. The method of claim 29, wherein the filter profile includes filter criteria including at least one of a rights expression type, a minimum value, a maximum value, a rights expression type operator, a minimum value operator, and a maximum value operator.

31. The method of claim 1, wherein the processing step includes calculating condition term usage costs based on respective terms of the conditions.

32. The method of claim 1, wherein the processing step includes calculating condition usage preferences for the conditions based on a user preference profile including a list of respective condition type name and positive rank score value pairs.

33. The method of claim 32, further comprising fine tuning the user preference profile based on previous user selection of the rights expressions to exercise with the use of a selection strength index associated with each condition type.

34. The method of claim 33, further comprising employing a horizontal asymptotic function to ensure that the value of the selection strength index reaches a maximum value at a predetermined pace but does not exceed the maximum value.

35. The method of claim 1, wherein the rights expressions include at least one of licenses and grants.

36. A system for processing plural rights expressions associated with an item for controlling use of the item in accordance with the rights expressions, the system comprising:
a computing device configured to receive a request to use the item, the item having associated rights expressions governing use of the item;
a computing device configured to return one or more rights expressions including one or more conditions that must be satisfied in order to use the item; and
a computing device configured to process the returned rights expressions in a manner to facilitate selection of the returned rights expressions in order to use the item in accordance with the selected rights expressions, and including:
a computing device configured to prioritize the returned rights expressions based on the one or more conditions of the returned rights expressions, so as to facilitate selection of the returned rights expressions.

37. A device for processing plural rights expressions associated with an item for controlling use of the item in accordance with the rights expressions, the device comprising:
a computing device configured to receive a request to use the item, the item having associated rights expressions governing use of the item;
a computing device configured to return one or more rights expressions including one or more conditions that must be satisfied in order to use the item; and a computing device configured to process the returned rights expressions in a manner to facilitate selection of the returned rights expressions in order to use the item in accordance with the selected rights expressions, and including:

a computing device configured to prioritize the returned rights expressions based on the one or more conditions of the returned rights expressions, so as to facilitate selection of the returned rights expressions.

* * * * *